US011457198B2

(12) United States Patent
Hanhart et al.

(10) Patent No.: US 11,457,198 B2
(45) Date of Patent: Sep. 27, 2022

(54) ADAPTIVE FRAME PACKING FOR 360-DEGREE VIDEO CODING

(71) Applicant: VID SCALE, INC., Wilmington, DE (US)

(72) Inventors: Philippe Hanhart, La Conversion (CH); Yuwen He, San Diego, CA (US); Yan Ye, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 0 days.

(21) Appl. No.: 16/960,948

(22) PCT Filed: Jan. 14, 2019

(86) PCT No.: PCT/US2019/013436
§ 371 (c)(1),
(2) Date: Jul. 9, 2020

(87) PCT Pub. No.: WO2019/143551
PCT Pub. Date: Jul. 25, 2019

(65) Prior Publication Data
US 2020/0344458 A1     Oct. 29, 2020

Related U.S. Application Data

(60) Provisional application No. 62/733,371, filed on Sep. 19, 2018, provisional application No. 62/617,939, filed on Jan. 16, 2018.

(51) Int. Cl.
*H04N 13/161* (2018.01)
*H04N 19/172* (2014.01)
(Continued)

(52) U.S. Cl.
CPC ......... *H04N 13/161* (2018.05); *H04N 19/172* (2014.11); *H04N 19/186* (2014.11); *H04N 19/593* (2014.11); *H04N 19/597* (2014.11)

(58) Field of Classification Search
CPC .. H04N 13/161; H04N 19/172; H04N 19/186; H04N 19/593; H04N 19/597
See application file for complete search history.

(56) References Cited

U.S. PATENT DOCUMENTS 11,025,952 B2   6/2021  Lv et al.
2018/0164593 A1*  6/2018  Van Der Auwera ........................
                                              H04N 21/816
(Continued)

FOREIGN PATENT DOCUMENTS

CN    107396138 A    11/2017
WO   2018/009746 A1   1/2018

OTHER PUBLICATIONS

Gary Sullivan,Meeting Report of the 7th meeting of the Joint Video Exploration Team (JVET), Torino, IT, Jul. 13-21, 2017,2017 (Year: 2017).*

(Continued)

*Primary Examiner* — Md N Haque
(74) *Attorney, Agent, or Firm* — Condo Roccia Koptiw LLP

(57) ABSTRACT

A video coding device may be configured to periodically select the frame packing configuration (e.g., face layout and/or face rotations parameters) associated with a RAS, The device may receive a plurality of pictures, which may each comprise a plurality of faces. The pictures may be grouped Into a plurality of RASs. The device may select a frame packing configuration with the lowest cost for a first RAS. For example, the cost of a frame packing configuration may be determined based on the first picture of the first RAS. The device may select a frame packing configuration for a second RAS. The frame packing configuration for the first RAS may be different than the frame packing configuration for the second RAS. The frame packing configuration for the (Continued)

first RAS and the frame packing configuration for the second RAS may be signaled in the video bitstream.

16 Claims, 26 Drawing Sheets

(51) Int. Cl.
*H04N 19/186* (2014.01)
*H04N 19/593* (2014.01)
*H04N 19/597* (2014.01)

(56) References Cited

U.S. PATENT DOCUMENTS

2018/0205934 A1* 7/2018 Abbas .................. H04N 13/161
2019/0089981 A1* 3/2019 Lv .......................... H04N 19/44

OTHER PUBLICATIONS

360LIB, Available at <https://jvet.hhi.fraunhofer.de/svn/svn_360Lib/>, 1 page.
Abbas et al., "AHG8: New GoPro Test Sequences for Virtual Reality Video Coding", JVET-D0026, GoPro, Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-6.
Abbas et al., "New Test Sequences for Spherical Video Coding from GoPro", JVET-G0147, Joint Video Exploration Team (JVET) of ITU-T SG 16 WP 3 and ISO/IEC JTC 1/SC 29/WG 11, 7$^{th}$ Meeting, Torino, IT, Jul. 2017, pp. 1-5.
Asbun et al., "AHG8: InterDigital Test Sequences for Virtual Reality Video Coding", JVET-D0039, InterDigital Communications, Inc., Joint Video Exploration Team (JVET) of ITU-T SG 16 WP 3 and ISO/IEC JTC 1/SC 29/WG 11, 4th Meeting: Chengdu, CN, Oct. 15-21, 2016, 4 pages.
Asbun et al., "Test Sequences for Virtual Reality Video Coding from InterDigital", JVET-G0055, Joint Video Exploration Team (JVET) of ITU-T SG 16 WP 3 and ISO/IEC JTC 1/SC 29/WG 11, 7$^{th}$ Meeting, IT, Jul. 2017, pp. 1-4.
Baroncini et al., "Results of the Joint Call for Evidence on Video Compression with Capability beyond HEVC", JVET-G1004, Joint Video Exploration Team (JVET) of ITU-T SG 16 WP 3 and ISO/IEC JTC 1/SC 29/WG 11, 7$^{th}$ Meeting, Torino, IT, Jul. 2017, pp. 1-17.
Boyce et al., "AHG8: Spherical Rotation Orientation SEI for Coding of 360 Video", JVET-E0075, Joint Video Exploration Team (JVET) of ITU-T SG 16 WP 3 and ISO/IEC JTC 1/SC 29/WG 11, 5$^{th}$ Meeting, Geneva, CH, Jan. 2017, pp. 1-8.
Boyce et al., "EE4: Padded ERP (PERP) Projection Format", JVET-G0098, Intel Corp., Joint Video Exploration Team (JVET) of ITU-T SG 16 WP 3 and ISO/IEC JTC 1/SC 29/WG 11, 7th Meeting: Torino, IT, Jul. 13-21, 2017, pp. 1-10.
Boyce et al., "JVET Common Test Conditions and Evaluation Procedures for 360° Video", JVET-F1030-V4, Joint Video Exploration Team (JVET) of ITU-T SG 16 WP 3 and ISO/IEC JTC 1/SC 29/WG 11, 6th Meeting: Hobart, AU, Mar. 31-Apr. 7, 2017, pp. 1-7.
Boyce et al., "Supplemental Enhancement Information for Coded Video Bitstreams (Draft 3)", JVET-Q2007-V6, Editors, Joint Video Experts Team (JVET) of ITU-T SG 16 WP 3 and ISO/IEC JTC 1/SC 29/WG 11, 17th Meeting: Brussels, BE, Jan. 7-17, 2020, 82 pages.
Chen et al., "Algorithm Description for Versatile Video Coding and Test Model 2 (VTM 2)", JVET-K1002-V2, Editors, Joint Video Experts Team (JVET) of ITU-T SG 16 WP 3 and ISO/IEC JTC 1/SC 29/WG11, 11th Meeting: Ljubljana, SI, Jul. 10-18, 2018, pp. 1-21.
Chen et al., "Algorithm Description of Joint Exploration Test Model 7 (JEM 7)", JVET-G1001-V1, Editors, Joint Video Exploration Team (JVET) of ITU-T SG 16 WP 3 and ISO/IEC JTC 1/SC 29/WG 11, 7th Meeting: Torino, IT, Jul. 13-21, 2017, 50 pages.

Choi, Byeongdoo, "Technologies under Consideration for Omnidirectional Media Application Format", Systems Subgroup, ISO/IEC JTC1/SC29/WG11 N15946, San Diego, CA, US, Feb. 2016, 16 pages.
Coban et al., "AHG8: Adjusted Cubemap Projection for 360-Degree Video", JVET-F0025, Qualcomm Inc., Joint Video Exploration Team (JVET) of ITU-T SG 16 WP 3 and ISO/IEC JTC 1/SC 29/WG 11, 6th Meeting: Hobart, AU, Mar. 31-Apr. 7, 2017, pp. 1-6.
Facebook360, "Facebook 360 Video", Available at <https://facebook360.fb.com/>, pp. 1-5.
Github, "Facebook's Equirectangular to Cube Map Tool on GitHub", Transform 360, Available at <https://github.com/facebook/transform?files=1>, pp. 1-3.
Google, "Bringing Pixels Front and Center in VR Video", Available at <https://www.blog.google/products/google-vr/bringing-pixels-front-and-center-vr-video/>, Mar. 14, 2017, pp. 1-8.
Google VR, "Google Cardboard", Available at <https://www.google.com/get/cardboard/>, pp. 1-4.
Hanhart et al., "InterDigital's Response to the 360° Video Category in Joint Call for Evidence on Video Compression with Capability beyond HEVC", JVET-G0024, InterDigital Communications Inc., Joint Video Exploration Team (JVET) of ITU-T SG 16 WP 3 and ISO/IEC JTC 1/SC 29/WG 11, 7th Meeting: Torino, IT, Jul. 13-21, 2017, pp. 1-16.
He et al., "AHG8: Algorithm Description of Projection Format Conversion in 360Lib", JVET-E0084, InterDigital Communications Inc., Samsung Electronics Co. Ltd., MediaTek Inc., Zhejiang University, Qualcomm Inc., OwlReality, Joint Video Exploration Team (JVET) of ITU-T SG 16 WP 3 and ISO/IEC JTC1/SC 29/WG 11, 5th Meeting: Geneva, CH, Jan. 12-20, 2017, pp. 1-15.
HTC, "HTC Vive", Available at <https://www.htcvive.com/us/>, pp. 1-3.
ISO/IEC, "Requirements for OMAF", Requirements, ISO/IEC JTC1/SC29/WG11 N16143, San Diego, CA, US, Feb. 2016, 2 pages.
Kuzyakov et al., "Next-Generation Video Encoding Techniques for 360 Video and VR", Facebook Code, Available at <https://code.facebook.com/posts/1126354007399553/next-generation-video-encoding-techniques-for-360-video-and-vr/>, Jan. 21, 2016, pp. 1-6.
Ma et al., "Simplification of the Common Test Condition for Fast Simulation", JVET-B0036, Joint Video Exploration Team (JVET) of ITU-T SG 16 WP 3 and ISO/IEC JTC 1/SC 29/WG 11, 2$^{nd}$ Meeting, San Diego, USA, Feb. 2016, pp. 1-6.
Norkin et al., "Call for Test Materials for Future Video Coding Standardization", JVET-B1002, ITU-T Q6/16 Visual Coding (VCEG) and ISO/IEC JTC1/SC29/WG11 Coding of Moving Pictures and Audio (MPEG), Joint Video Exploration Team (JVET) of ITU-T SG 16 WP 3 and ISO/IEC JTC 1/SC 29/WG 11, 2nd Meeting: San Diego, USA, Feb. 20-26, 2016, pp. 1-4.
Oculus, "Oculus Rift", Available at <https://www.oculus.com/en-us/rift/>, pp. 1-19.
Schwarz et al., "Tampere Pole Vaulting Sequence for Virtual Reality Video Coding", JVET-D0143, Nokia, Tampere University of Technology, Rakka Creative, Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-2.
Segall et al., "Draft Joint Call for Proposals on Video Compression with Capability beyond HEVC", JVET-G1002, Editors, Joint Video Exploration Team (JVET) of ITU-T SG 16 WP 3 and ISO/IEC JTC 1/SC 29/WG 11, 7th Meeting: Torino, IT, Jul. 13-21, 2017, 28 pages.
Sullivan et al., "Meeting Notes of the 3rd Meeting of the Joint Video Exploration Team (JVET)", JVET-C1000, Responsible Coordinators, Joint Video Exploration Team (JVET) of ITU-T SG 16 WP 3 and ISO/IEC JTC 1/SC 29/WG 11, 3rd Meeting: Geneva, CH, May 26-Jun. 1, 2016, pp. 1-73.
Sun et al., "Test Sequences for Virtual Reality Video Coding from LetinVR", JVET-G0053, Joint Video Exploration Team (JVET) of ITU-T SG 16 WP 3 and ISO/IEC JTC 1/SC 29/WG 11, 7$^{th}$ Meeting, Torino, Jul. 2017, pp1-5.
Sun et al., "Test Sequences for Virtual Reality Video Coding from LetinVR", JVET-D0179, Letin VR Digital Technology Co., Ltd.,

(56) References Cited

OTHER PUBLICATIONS

Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-5.

Thomas et al., "5G and Future Media Consumption", TNO, ISO/IEC JTC1/SC29/WG11 MPEG2016/m37604, San Diego, CA, US, Feb. 2016, 10 pages.

Wien et al., "Joint Call for Evidence on Video Compression with Capability beyond HEVC", JVET-F1002, Joint Video Exploration Team (JVET), of ITU-T SG 16 WP 3 and ISO/IEC JTC 1/SC 29/WG 11, Hobart, AU, Mar. 31-Apr. 7, 2017, pp. 1-11.

Xiu et al., "Description of SDR, HDR and 360° Video Coding Technology Proposal by InterDigital Communications and Dolby Laboratories", JVET-J0015-V1, InterDigital Communications, Inc., Dolby Laoratories, Inc., Joint Video Experts Team (JVET) of ITU-T SG 16 WP 3 and ISO/IEC JTC1/SC 29/WG 11, 10th Meeting: San Diego, US, Apr. 10-20, 2018, 82 pages.

Ye et al., "Algorithm Descriptions of Projection Format Conversion and Video Quality Metrics in 360Lib", JVET-F1003-V1, Editors, Joint Video Exploration Team (JVET) of ITU-T SG 16 WP 3 and ISO/IEC JTC 1/SC 29/WG 11, 6th Meeting: Hobart, AU, Mar. 31-Apr. 7, 2017, pp. 1-33.

Youtube, "360 Video", Virtual Reality, Available at <https://www.youtube.com/channel/UCzuqhhs6NWbgTzMuM09WKDQ>, pp. 1-3.

\* cited by examiner

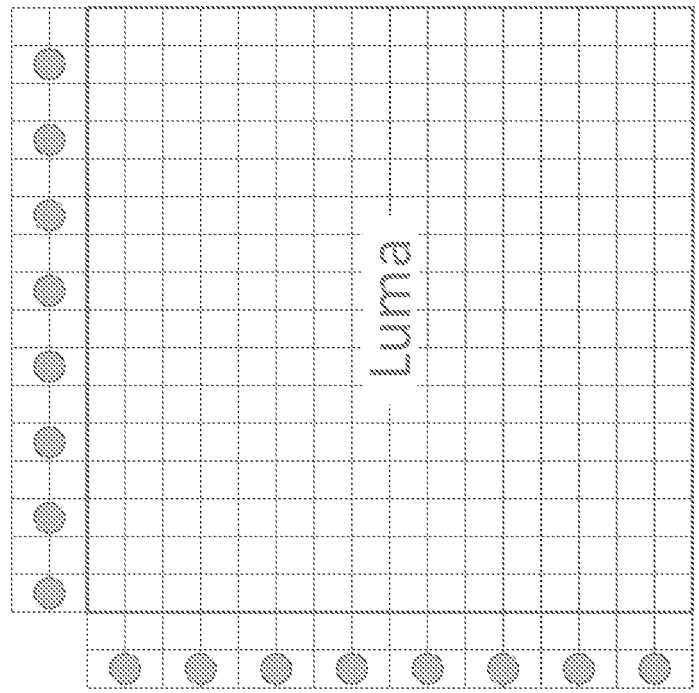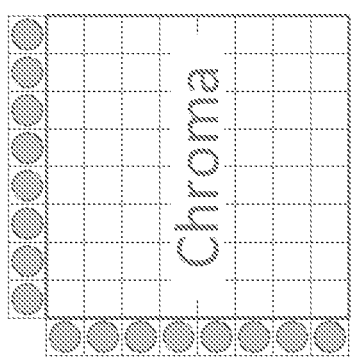
FIG. 11

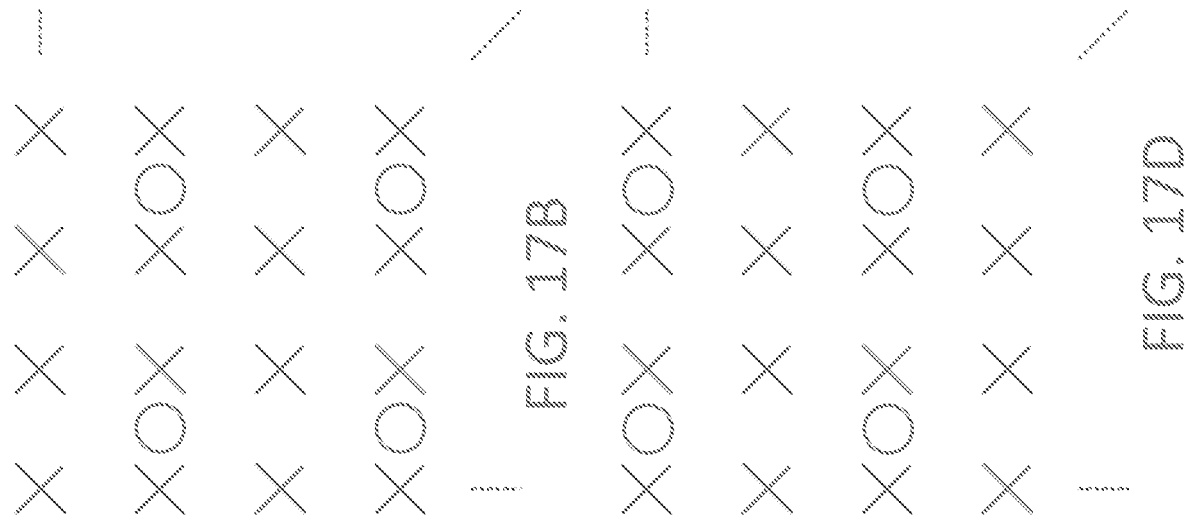
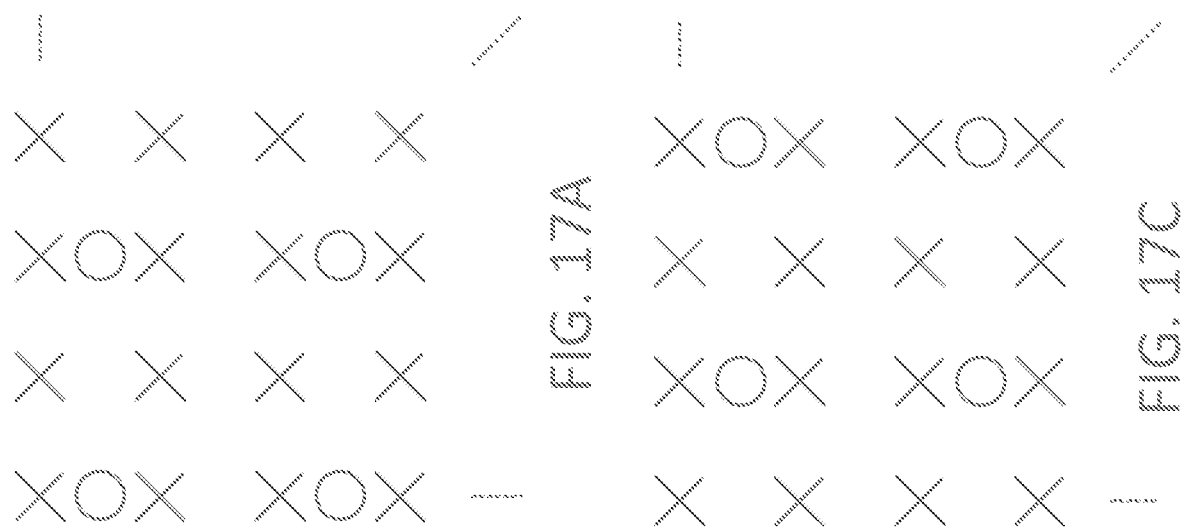

ADAPTIVE FRAME PACKING FOR 360-DEGREE VIDEO CODING

CROSS REFERENCE

This application is the National Stage Entry under 35 U.S.C. § 371 of Patent Cooperation Treaty Application No. PCT/US2019/013436, filed Jan. 14, 2019, which claims the benefit of U.S. Provisional Application No. 62/617,939 filed Jan. 16, 2018 and U.S. Provisional Application No. 62/733, 371, filed Sep. 19, 2018 the contents of which are incorporated by reference herein.

BACKGROUND

360° video is a rapidly growing format emerging in the media industry. 360° video is enabled by the growing availability of virtual reality (VR) devices. 360° video may provide the viewer a new sense of presence. When compared to rectilinear video (e.g., 2D or 3D), 360° video may pose difficult engineering challenges on video processing and/or delivery. Enabling comfort and/or an immersive user experience may require high video quality and/or very low latency. The large video size of 360° video may be an impediment to delivering the 360° video in a quality manner at scale.

SUMMARY

A video coding device may predictively code a current picture in a 360-degree video based on a reference picture having a different frame packing configuration. The current picture may be a frame-packed picture having one or more faces. The frame packing configuration (e.g., face layout and/or face rotations parameters) for the current picture may be identified, and the frame packing configuration for a reference picture of the current picture may be identified. Whether to convert the frame packing configuration of the reference picture to match the current picture may be determined based on a comparison of the frame packing configuration for the current picture and the frame packing configuration for the reference picture. The device may convert the frame packing configuration of the reference picture to match the frame packing configuration of the current picture when the frame packing configuration of the reference picture is different than the frame packing configuration of the current picture. The device may predict the current picture based on the reference picture.

A video coding device may be configured to determine whether to convert the frame packing configuration (e.g., face layout and/or face rotations parameters) of reference picture used to predict a current picture. The video coding device may determine to convert the frame packing configuration of the reference picture to match the frame packing configuration of the current picture when the frame packing configuration for the current picture and the frame packing configuration for the reference picture are different. The device may determine that the frame packing configuration for the current picture and the frame packing configuration for the reference picture are different based on parameters associated with the current picture and/or the reference picture (e.g., a picture parameter set (PPS) identifier).

A video device may determine a frame packing configuration (e.g., face layout and/or face rotations parameters) associated with a current picture. The frame packing configuration associated with the current picture may be identified based on received frame packing information. The device may determine whether to receive frame packing information associated with the current picture. The device may determine whether to receive frame packing information associated with a current picture based on the frame type of the current picture. For example, the device may determine to receive frame packing information associated with the current picture when the current picture is an intra-coded picture. The device may determine a frame packing configuration based on the received frame packing information. The frame packing configuration may be associated with the current picture and one or more subsequent pictures (e.g., one or more pictures in a random access segment (RAS)).

A video coding device may be configured to periodically select the frame packing configuration (e.g., face layout and/or face rotations parameters) for frames in a 360 video. The device may receive a plurality of pictures, which may each comprise a plurality of faces. The pictures may be grouped into a plurality of RASs. The frame packing information may change from RAS to RAS. The device may select a frame packing configuration for a first RAS. The device may select a frame packing configuration for a second RAS. The frame packing configuration for the first RAS may be different than the frame packing configuration for the second RAS. The frame packing configuration for the first RAS and the frame packing configuration for the second RAS may be signaled in the video bitstream. In an example, a predetermined set of frame packing configurations may be cycled through.

A video coding device may be configured to select a frame packing configuration for a RAS. The device may determine a gradient for the faces in a first picture of the RAS (e.g., an infra coded picture). The gradient may be a dominant gradient. The gradient may be computed on luma samples. The device may determine a potential cost associated with coding the first picture for each of a plurality of frame packing configurations. The potential cost for each of the plurality of frame packing configurations may be based on the gradient of the faces. The device may select a frame packing configuration with the lowest cost.

BRIEF DESCRIPTION OF THE DRAWINGS

FIG. 11 illustrates examples associated with cross-component linear model prediction

FIGS. 17A-17D illustrates examples associated with the luma and chroma samples of a picture.

DETAILED DESCRIPTION

A detailed description of illustrative embodiments will now be described with reference for the various Figures. Although this description provides detailed examples of possible implementations, it should be noted that the details are intended to be exemplary and in no way limit the scope of the application.

Virtual reality (VR) systems may use 360-degree video to provide users with tire capability to view the scene from 360-degree angles in the horizontal direction and 180-degree angles in the vertical direction. VR and 360-degree video may be the direction for media consumption beyond Ultra High Definition (UHD) service. Work on the requirements and potential technologies for omnidirectional media application format may be performed to improve the quality of 360-degree video in VR and/or to standardize the processing chain for client's interoperability. Free view TV (FTV) may test the performance of one or more of the following: 360-degree video (omnidirectional video) based system, and/or multi-view based system.

The quality and/or experience of one or more aspects in the VR processing chain may be improved. For example, the quality and/or experience of one or more aspects in capturing, processing, displaying, etc., associated with VR processing may be improved. VR capturing may use one or more cameras to capture a scene from one or more different and/or divergent views (e.g., 6-12 views). The views may be stitched together to form a high resolution (e.g., 4K or 8K) 360-degree video. On the client side and/or the user side, a VR system may include a computational platform, head mounted display (HMD), and/or head tracking sensors. The computational platform may receive and/or decode a 360-degree video. The computational platform may generate a viewport for display (e.g., on an HMD). One or more pictures (e.g., two, one for each eye) may be rendered for the viewport. The pictures may be displayed in HMD (e.g., for stereo viewing). A lens may be used to magnify the image displayed in HMD for better viewing. A head tracking sensor may track the orientation of the viewer's head, and/or may feed the orientation information to a system (e.g., to display the viewport picture for that orientation).

A projective representation of 360-degree video may be generated. 360-degree videos may be compressed and/or delivered, for example, using dynamic adaptive streaming over HTTP (DASH)-based video streaming techniques. 360-degree video delivery may be implemented, for example, using a spherical geometry structure to represent 360-degree information. For example, the synchronized multiple views captured by the multiple cameras may be stitched on the sphere (e.g., as one integral structure). The sphere information may be projected onto 2D planar surface via geometry conversion (e.g., equirectangular projection and/or cubemap projection).

Figure 1A:
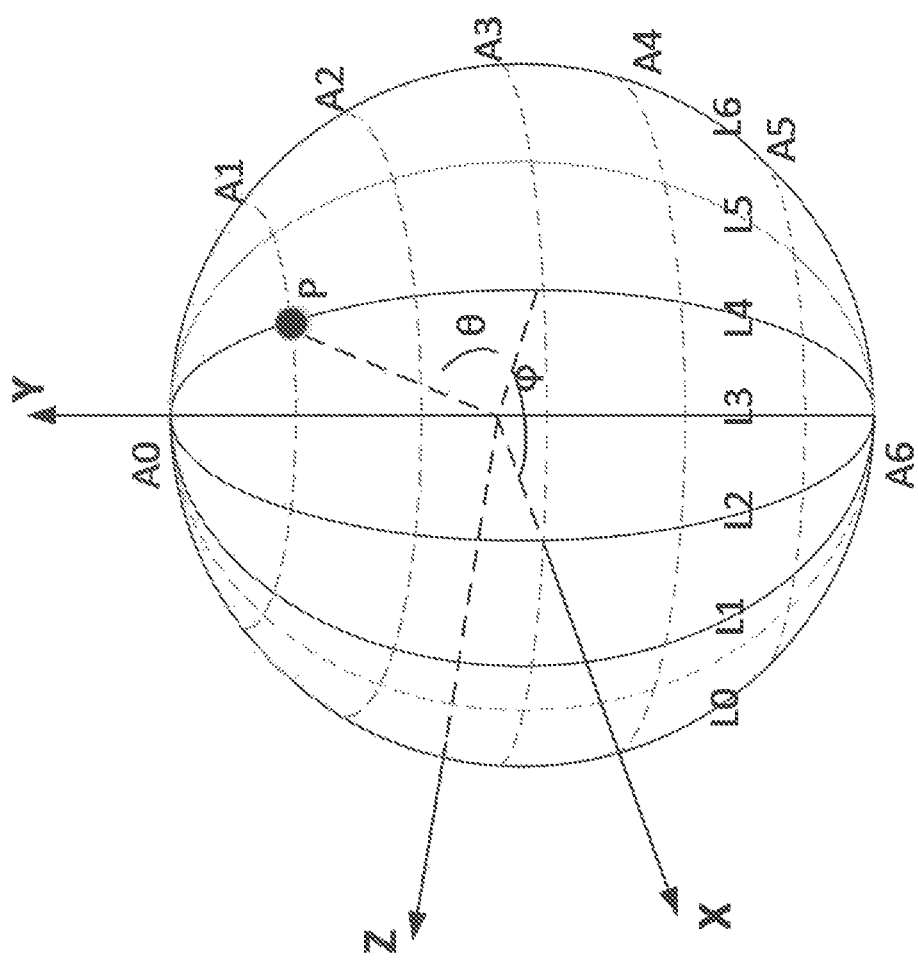
FIG. 1A illustrates an example spherical sampling in longitude and latitude.
Figure 1B:
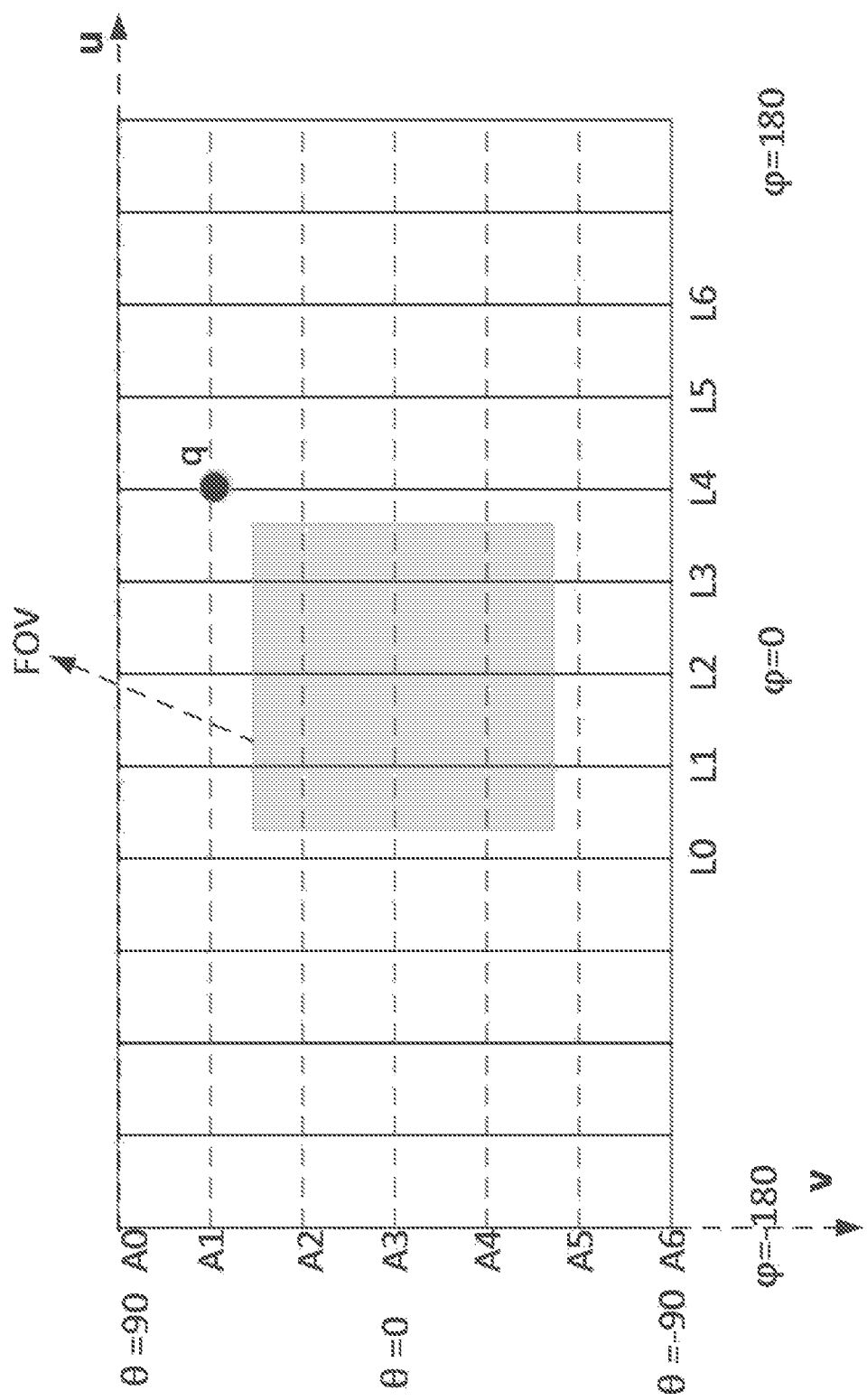
FIG. 1B illustrates an example 2D planner with eguirectangular projection.

A 360-degree video may be projected using equirectangular projection (ERP). FIG. 1A shows an example spherical sampling using longitudes ($\varphi$) and latitudes ($\theta$). FIG. 1B shows an exemplary sphere projected onto a 2D plane using ERP. The longitude $\varphi$ may be within the range $[-\pi, \pi]$ and may be referred to as yaw. The latitude $\theta$ may be within the range $[-\pi/2, \pi/2]$ and may be referred to as pitch in aviation. $\pi$ is the ratio of a circle's circumference to its diameter. (x, y, z) may represent a point's coordinates in a 3D space. (ue, ve) may represent the point's coordinates in a 2D plane using ERP. ERP may be represented mathematically, for example, as shown in (1) and (2).

$$ue = (\varphi/(2*\pi)+0.5)*W \quad \text{Formula (1)}$$

$$ve = (0.5-\theta/\pi)*H \quad (2)$$

Referring to (1) and (2), W and H may be the width and height of the 2D planar picture. As seen in FIG. 1A, the point P may be the cross point between longitude L4 and latitude A1 on a sphere. As illustrated in FIG. 1B, the point P may be mapped to a unique point q on a 2D plane using (1) and/or (2). The point q in FIG. 1B may be projected back to point P on the sphere shown in FIG. 1A, for example via inverse projection. The field of view (FOV) in FIG. 1B shows an example where the FOV in a sphere is mapped to a 2D plane with a viewing angle along the X axis at about 110 degrees.

A 360-degree video may be mapped to a 2D video. The mapped video may be encoded using a video codec (e.g., H.264. HEVC) and/or may be delivered to a client. At the client, the equirectangular video may be decoded and/or rendered based on user's viewport (e.g., by projecting and/or displaying the portion belonging to FOV in an equirectangular picture onto a HMD). A spherical video may be transformed to a 2D planar picture for encoding with ERP. The characteristics of an equirectangular 2D picture may be different from a non-equirectangular 2D picture (e.g., rectilinear video). A top portion of a picture, which may correspond to a north pole, and a bottom portion of a picture, which may correspond to a south pole, may be stretched. For example, the top portion and the bottom portion of a picture may be stretched when compared to a middle portion of the picture, which may correspond to an equator. Stretching of the top and bottom portions of a picture may indicate that the equirectangular sampling in the 2D spatial domain is uneven. A motion field in the 2D equirectangular picture may be complex along the temporal direction.

Boundaries (e.g., the left and right boundaries) of an ERP picture may be coded (e.g., coded independently). Coding of the boundaries may create visual artifacts (e.g., "face seams") in the reconstructed video. For example, visual artifacts (e.g., "face seems") may be created when a reconstructed video is used to render a viewport, which may be displayed to the user (e.g., via HMD and/or via a 2D screen). One or more luma samples (e.g., 8) may be padded at the boundaries (e.g., the left and the right sides of the picture). The padded ERP picture may be encoded. A reconstructed ERP picture with padding may be converted back using one or more of the following: blending the duplicated samples or cropping the padded areas.

A 360-degree video may be projected using cubemap projection. The top and bottom portions of an ERP picture may correspond to a north and south pole, respectively The top and bottom portions of an ERP picture may be stretched (e.g., when compared to the middle portion of the picture). Stretching of the top and bottom portions of an ERP picture may indicate that the spherical sampling density of the picture is not even. A motion field may describe the temporal correlation among neighboring ERP pictures. Video codecs (e.g., MPEG-2, H.264, and/or HEVC) may use a translational model to describe the motion field. The translational model may or may not represent shape varying movements (e.g., shape varying movements in planar ERP pictures).

Figure 2B:
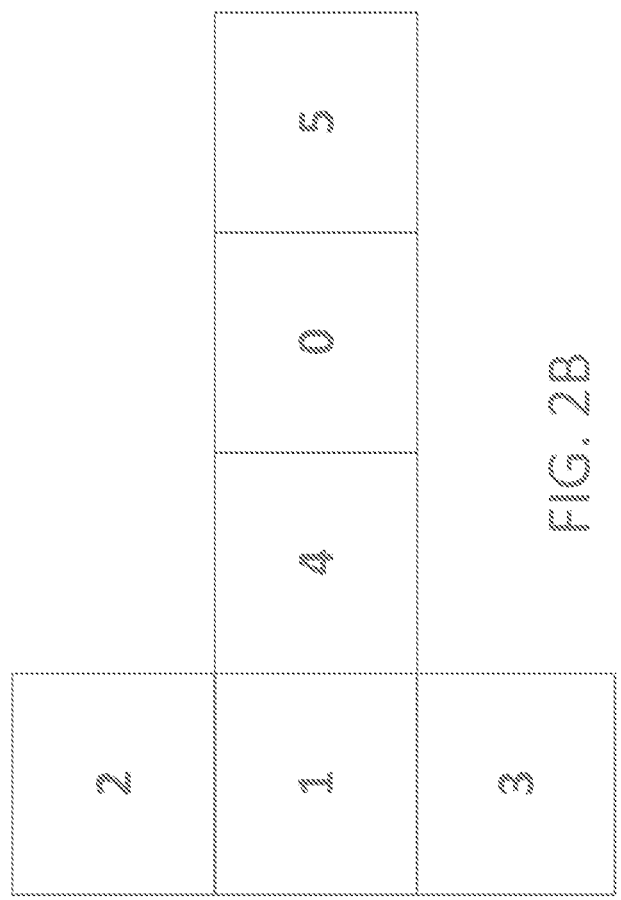
FIG. 2B illustrates an example two-dimensional (2D) planner for six faces associated with CMP.
Figure 2A:
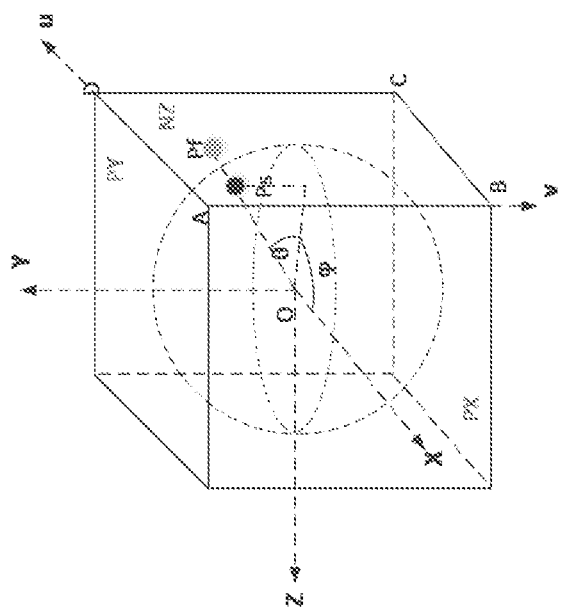
FIG. 2A illustrates an example three-dimensional (3D) geometric structure associated with cubemap projection (CMP).

A 360-degree video may be projected using a geometric projection format. Geometric projection formats may map 360-degree video onto one or more faces (e.g., multiple faces). For example, a cubemap projection (CMP) may be used to project a 360-degree video. FIG. 2A is an example illustration of a CMP geometry. As illustrated in FIG. 2A, CMP may include six square faces. The faces may be labeled as PX, PY, PZ, NX, NY, NZ. P may refer to positive, and N may refer to negative. X, Y, and Z may refer to the axes, respectively. The faces may be labeled using numbers 0-5, e.g., PX (0), NX (1), PY (2), NY (3), PZ (4), NZ (5). If the radius of the tangent sphere is 1, the lateral length of each face may be 2. The faces of a CMP format may be packed together into a picture. The faces of a CMP format may be packed into a picture because a video codec may not support spherical video. A face may be rotated, for example, by a certain number of degrees. Face rotation may affect (e.g. maximize and/or minimize) the continuity between neighboring faces. FIG. 2B is an example illustration of frame packing. As illustrated in FIG. 2B, the faces may be packed into a rectangular picture. Referring to FIG. 2B, the face index marked on a face may indicate the rotation of the face, respectively For example, face #3 and #1 may be rotated counter-clockwise by 270 and 180 degrees, respectively. The other faces may not be rotated. As seen in FIG. 2B, a top row of 3 faces may be spatially neighboring faces in a 3D geometry and/or may have a continuous texture. As seen in FIG. 2B, a bottom row of 3 faces may be spatially neighboring faces in a 3D geometry and/or may have a continuous texture. The top face row and the bottom face row may or may not be spatially continuous in a 3D geometry. A seam (e.g., a discontinuous boundary) may exist between the two face rows (e.g., when a top face row and bottom face row are not spatially continuous).

In CMP, the sampling density at the center of a face may be one (1). If the sampling density at the center of a face is one (1), the sampling density towards the edges of the face may increase. The texture around the edges of a face may be stretched, for example, when compared to the texture at the center of the face. Cubemap-based projections (e.g., equiangular cubemap projection (EAC) and/or adjusted cubemap projection (ACP)) may adjust a face. A face may be adjusted using a function, for example, a non linear warping function. The function may be applied to the face in the vertical and/or horizontal directions. A face may be adjusted using a tangent function (e.g., in EAC). A face may be adjusted using a second order polynomial function (e.g., in ACP).

A video may be projected using hybrid cubemap projection (HCP). An adjustment function may be applied to a face. The parameters of an adjustment function may be tuned for a face. An adjustment function may be tuned for a certain direction of a face (e.g., tuned for each direction of a face individually). Cube-based projections may pack the faces of a picture (e.g., similarly to CMP). Face discontinuity within a frame packed picture may occur in a cube-based projection.

Figure 3:
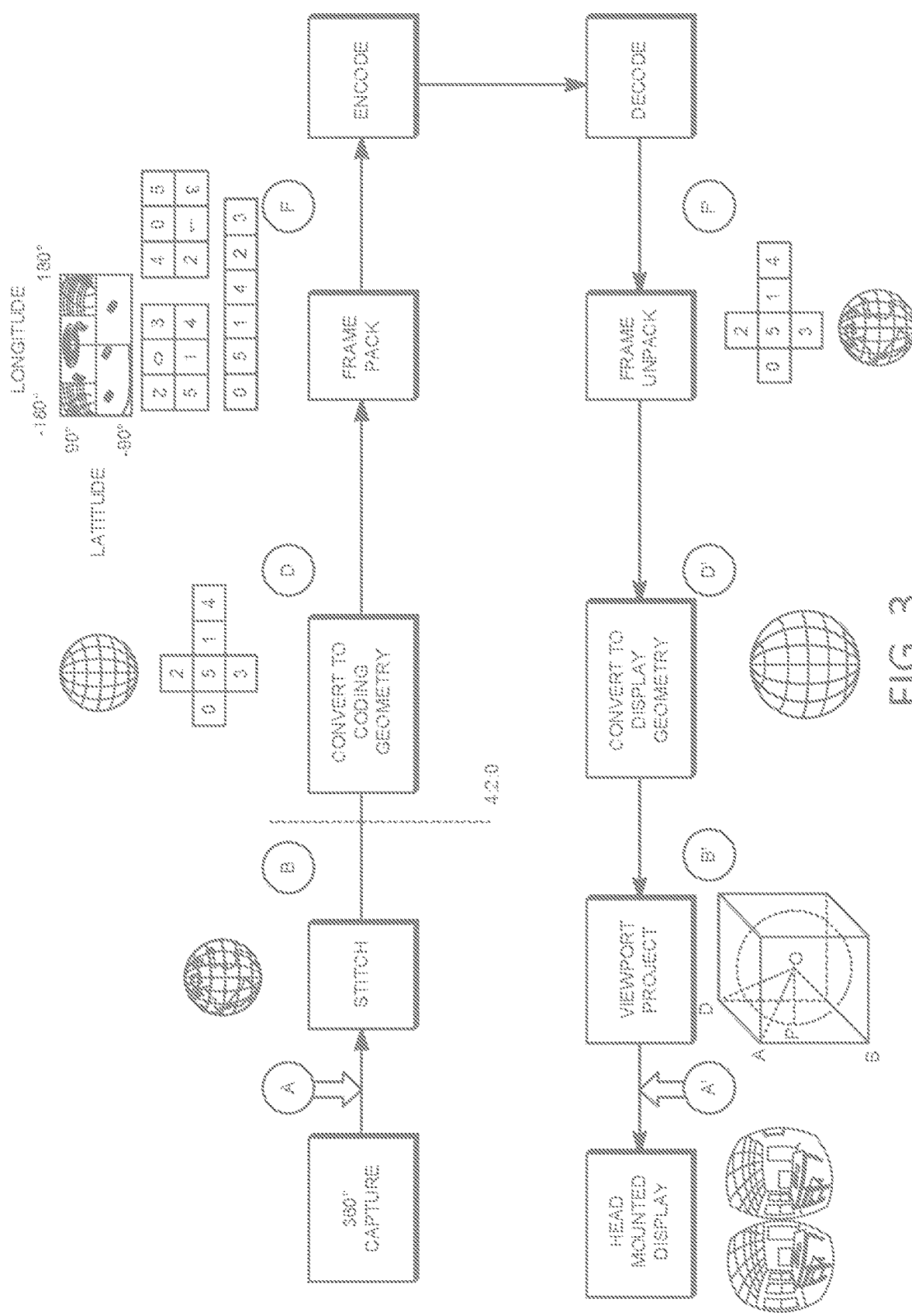
FIG. 3 illustrates an example implementation of a 360-degree video system.

A 360-degree video may be encoded using hybrid video encoding. An example 360-degree video delivery implementation is illustrated in FIG. 3. As seen in FIG. 3, 360-degree video delivery may include a 360-degree video capture, which may use one or more cameras to capture videos covering a spherical space. The videos from the cameras may be stitched together to form a native geometry structure. For example, the videos may be stitched together in an equirectangular projection (ERP) format. The native geometry structure may be converted to one or more projection formats for encoding. A receiver of the video may decode and/or decompress the video. The receiver may convert the video to a geometry, e.g., for display. The video may be rendered, for example, via viewport projection according to user's viewing angle.

Figure 4:
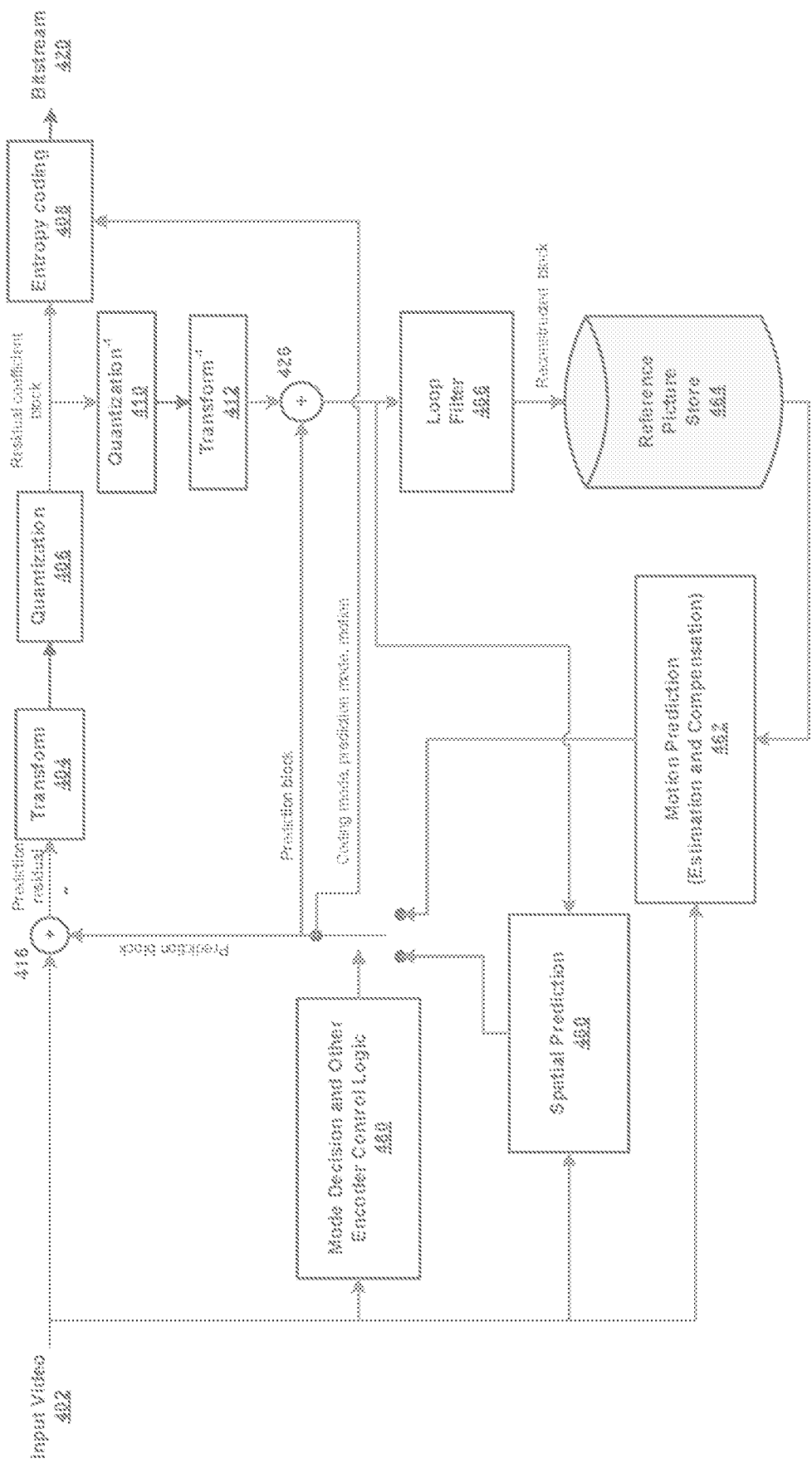
FIG. 4 illustrates an example of an encoder.

FIG. 4 illustrates a block diagram of an example block-based hybrid video encoding system 400. The input video signal 402 may be processed block by block. Extended block sizes (e.g., referred to as a coding unit or CU) may be used to compress high resolution (e.g., 1080p and/or beyond) video signals. A CU may include up to 64×64 pixels. A CU may be partitioned into prediction units or PUs. A CU may be separately predicted. For an input video block (e.g., a macroblock (MB) or CU), spatial prediction 460 or motion prediction 462 may be performed. Spatial prediction (e.g., or intra prediction) may use pixels from already coded neighboring blocks in the same video picture and/or slice to predict a current video block. Spatial prediction may reduce the spatial redundancy in a video signal. Motion prediction (e.g., referred to as inter prediction or temporal prediction) may use pixels from already coded video pictures to predict a current video block. Motion prediction may reduce temporal redundancy inherent in the video signal. A motion prediction signal for a given video block may be signaled by a motion vector that indicates the amount and/or direction of motion between the current block and its reference block. If multiple reference pictures are supported (e.g., in H.264/AVC or HEVC), the reference picture index of a video block may be signaled to a decoder. The reference index may be used to identify from which reference picture in a reference picture store 464 the temporal prediction signal may come.

After spatial and/or motion prediction, a mode decision 480 in the encoder may select a prediction mode, for example based on a rate-distortion optimization. The prediction block may be subtracted from the current video block at 416. Prediction residuals may be de-correlated using a transform module 404 and a quantization module 406 to achieve a target bit-rate. The quantized residual coefficients may be inverse quantized at 410 and inverse transformed at 412 to form reconstructed residuals. The reconstructed residuals may be added back to the prediction block at 426 to form a reconstructed video block. An in-loop filter such as a de-blocking filter and/or an adaptive loop filter may be applied to the reconstructed video block at 466 before it is put in the reference picture store 464. Reference pictures in the reference picture store 464 may be used to code future video blocks. An output video bit-stream 420 may be formed. Coding mode (e.g., inter or intra), prediction mode information, motion information, and/or quantized residual coefficients may be sent to an entropy coding unit 408 to be compressed and packed to form the bit-stream 420.

Figure 5:
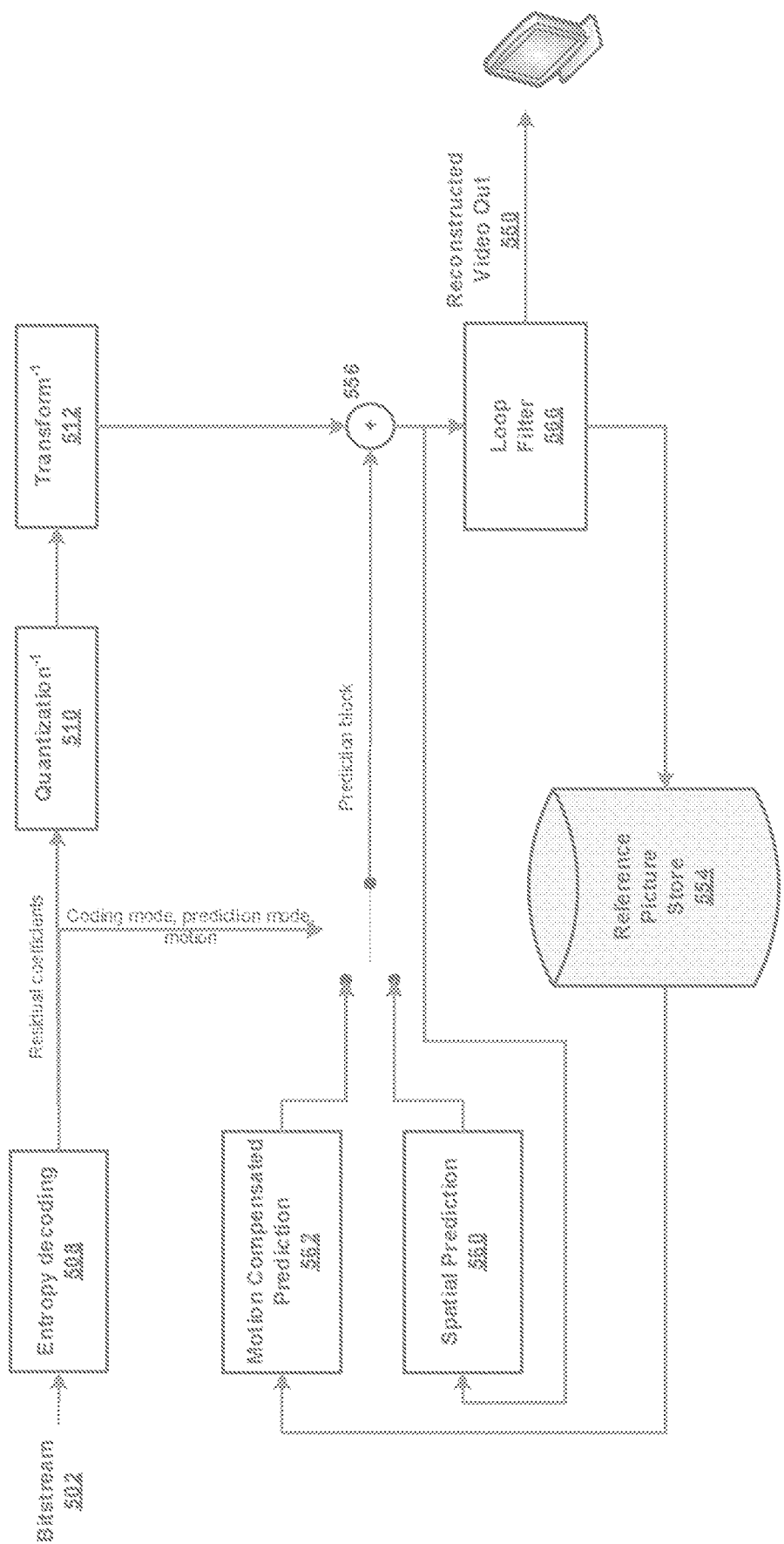
FIG. 5 illustrates an example of a decoder.

FIG. 5 shows a general block diagram of an example block-based video decoder. A video bit-stream 502 may be received, unpacked, and/or entropy decoded at an entropy decoding unit 508. Coding mode and/or prediction information may be sent to a spatial prediction unit 560 (e.g., if intra coded) and/or to a temporal prediction unit 562 (e.g., if inter coded). A prediction block may be formed the spatial prediction unit 560 and/or temporal prediction unit 562. Residual transform coefficients may be sent to an inverse quantization unit 510 and an inverse transform unit 512 to reconstruct a residual block. The prediction block and residual block may be added at 526. The reconstructed block may go through in-loop filtering 566 and may be stored in a reference picture store 564. Reconstructed videos in the reference picture store 564 may be used to drive a display device and/or to predict future video blocks.

Figure 6:
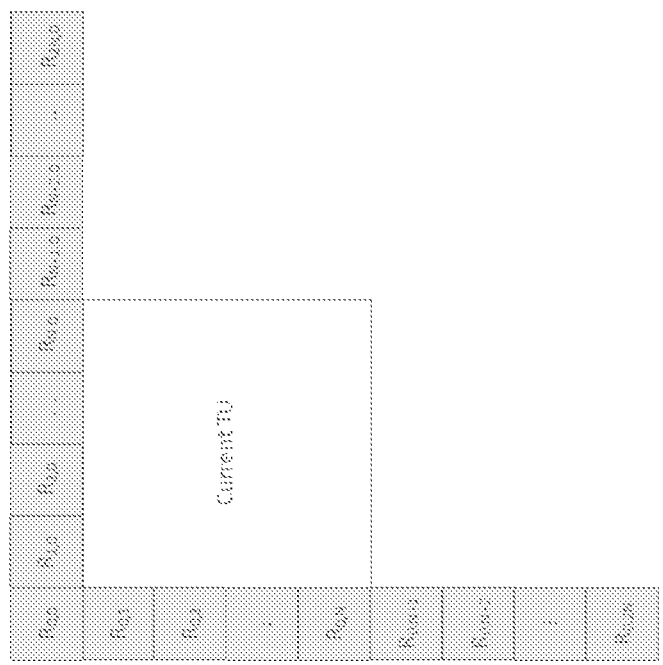
FIG. 6 illustrates example reference samples in intra prediction.

Video codecs may be used to code videos, for example, 2D planar rectilinear videos. Video coding may exploit spatial and/or temporal correlations to remove informational redundancies. One or more prediction techniques, such as, intra prediction and/or inter prediction, may be applied during video coding. Intra prediction may predict a sample value using reconstructed samples that neighbor the sample value. FIG. 6 shows example reference samples (e.g., $R_{0,0}$ to $R_{2N,0}$ and/or $R_{0,0}$ to $R_{0,2N}$) that may be used to intra-predict a current transform unit (TU). The reference samples may include reconstructed samples located above and/or to the left of the current TU. The reference samples may tie from left and/or top neighboring reconstructed samples.

Figure 7:
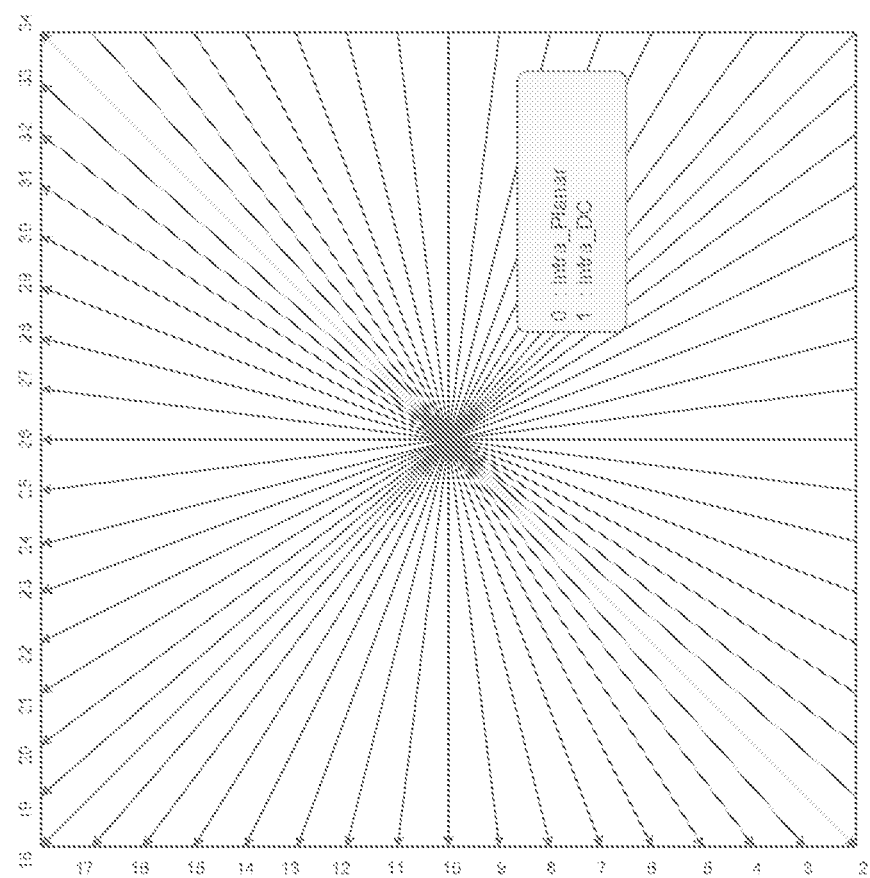
FIG. 7 illustrates an example indication of intra prediction directions.

A device may perform prediction using one or more intra prediction modes. The device may choose a certain intra prediction mode to use. FIG. 7 illustrates an example indication of intra prediction directions. One or more (e.g., thirty-five (35)) intra prediction modes may be used to perform prediction. For example, the intra prediction modes may include planar (0), DC (1), and/or angular predictions (2~34), as shown in FIG. 7. An appropriate intra prediction mode may be selected. For example, a video coding device may select an appropriate intra prediction mode. Predictions generated by multiple candidate intra prediction modes may be compared. The candidate intra prediction mode that produces the smallest distortion between prediction samples and original samples may be selected. The selected intra prediction mode may be coded into a bitstream.

Figure 8:
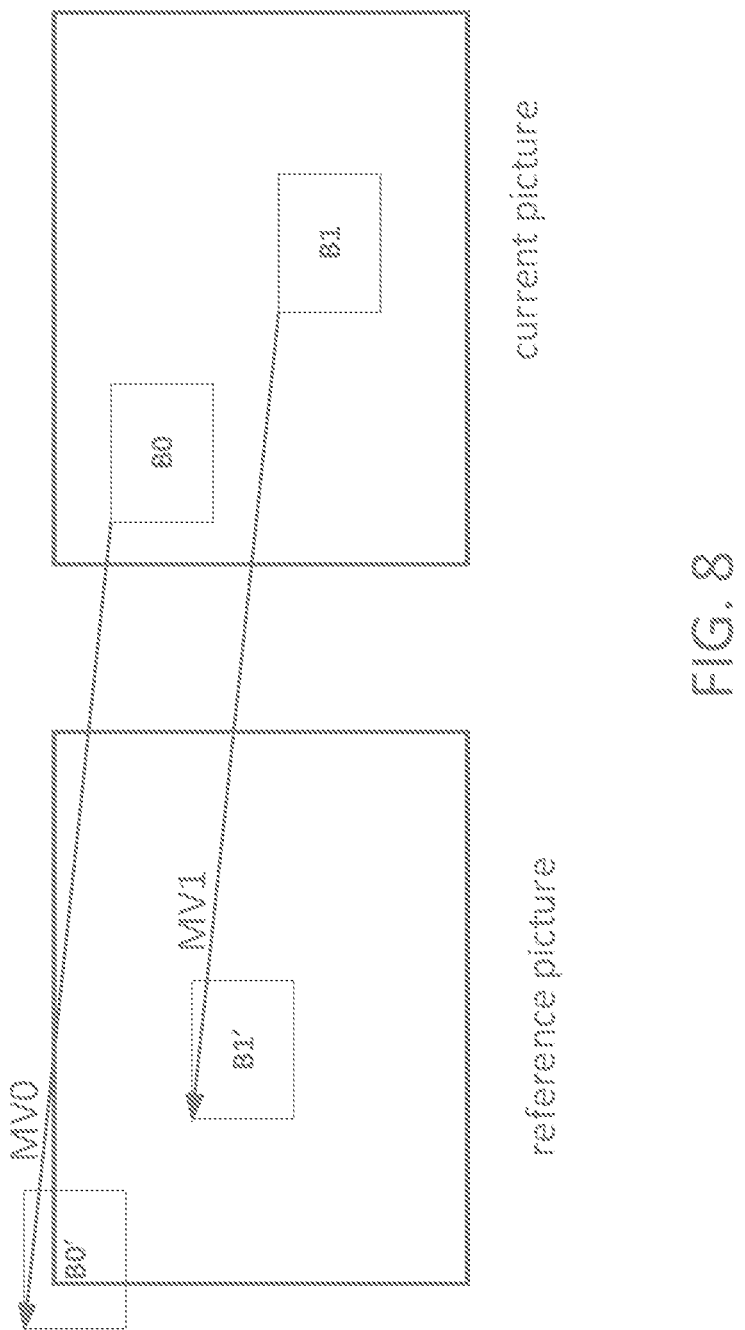
FIG. 8 illustrates an example of inter prediction with one motion vector.
Figure 9:
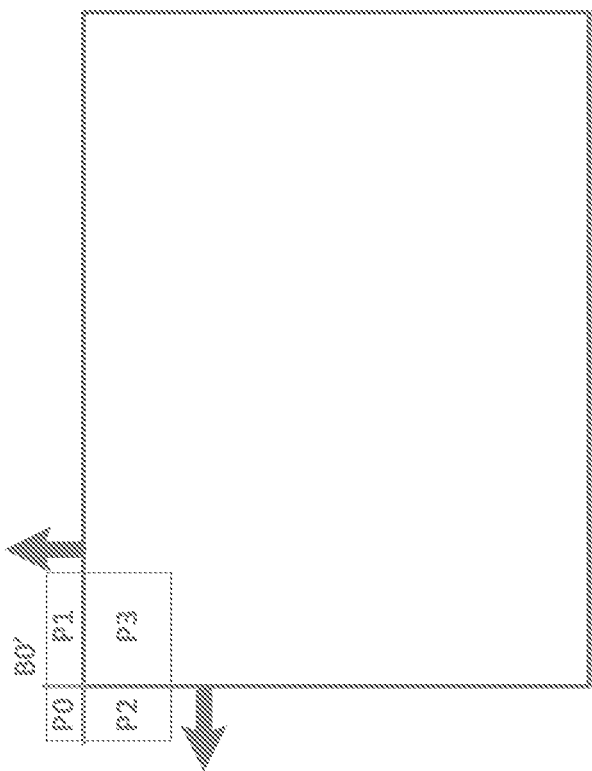
FIG. 9 illustrates an example padding for reference samples.

Angular predictions may be used to predict directional textures. FIG. 8 shows an example of inter prediction with a motion vector (MV). Blocks B0' and B1' in a reference picture may be respective reference blocks for blocks B0 and B1 of a current picture. Reference block B0' may be partially outside the boundary of the reference picture. Padding may be used to fill unknown samples outside picture boundaries. FIG. 9 shows an example padding for reference samples outside the picture boundary. For example, the padding examples for block B0' may have four parts P0, P1, P2, and P3. Parts P0, P1, and P2 may be outside the picture boundary and may be filled, for example, via padding. For example, part P0 may be filled with a top-left sample of the reference picture. Part P1 may be filled with vertical padding using a top-most row of the reference picture. Part P2 may be filled with horizontal padding using a left-most column of the picture.

Figure 10:
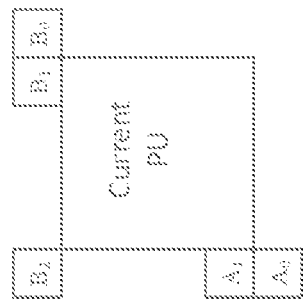
FIG. 10 illustrates an example associated with a merge process.

Inter coding (e.g., to encode motion vector information) may include the use of motion vector prediction and/or merge mode. Motion vector prediction may use the MVs from neighboring PUs or temporally collocated PU to predict a current MV. A video coding device may generate a motion vector predictor candidate list. A MV predictor may be selected from the candidate list. An index of the selected MV predictor may be coded and/or signaled to a video coding device. The video coding device may construct an MV predictor list. The entry with the signaled index may be used as a predictor of the current PU's MV. Merge mode may use and/or reuse the MV information of spatial and temporally neighboring PUs. The motion vectors for a current PU may or may not be coded. The video coding device may generate a list of one or more motion vector merge candidates. FIG. 10 illustrates an example of spatial neighbors (e.g., bottom left, left, top right, top, top left) that may be used for merge candidate derivation. A motion vector merge candidate may be selected from the list. An index of the selected merge candidate may be coded. An entry with the signaled merge candidate index may be used as the MV of current PU.

An intra (I) frame may be periodically inserted within a video sequence, which may enable random access (RA). The prediction structure between two successive I frames may be similar (e.g., the same). A full-length sequence may be split (e.g., into a set of independent random access segment (RAS)). A RAS may start and/or end with an I frame. One or more RASs may be encoded in parallel.

A video coding device may perform prediction based on a cross-component linear model (CCLM). For example, the video coding device may perform color conversion. For example, a video coding device may perform red green blue (RGB) to YUV color conversion. Color conversion may affect (e.g., increase and/or decrease) the correlation between different channels. The luma and the chroma channels for one or more video blocks may be correlated. A CCLM based prediction may be used to predict the chroma samples from the corresponding luma samples using a linear model. The value of a chroma sample $p_{i,j}$, may be predicted from the corresponding down sampled (e.g., if the video is in 4:2:0 and/or 4:2:2 chroma format) and/or reconstructed luma sample values, $L'_{i,j}$ using (3) (e.g., assuming a chroma block of N×N samples).

$$p_{i,j} = \alpha \cdot L'_{i,j} + \beta \qquad (3)$$

Down sampled luma samples may be computed using (4).

$$L'_{i,j} = \frac{L_{2i-1,2j} + 2 \cdot L_{2i,2j} + L_{2i+1,2j} + L_{2i-1,2j+1} + 2 \cdot L_{2i,2j+1} + L_{2i+1,2j+1}}{8} \qquad (4)$$

The parameters of a linear model may be derived by minimizing the regression error between neighboring reconstructed samples (e.g., the top and left neighboring reconstructed samples). The parameters of a linear model may be computed using (5) and/or (6).

$$a = \frac{2 \cdot N \cdot \left[\sum_{i=0}^{N-1}(L'_{i,-1} \cdot C_{i,-1}) + \sum_{j=0}^{N-1}(L'_{-1,j} \cdot C_{-1,j})\right] - \left(\sum_{i=0}^{N-1} L'_{i,-1} + \sum_{j=0}^{N-\lambda} L'_{-1,j}\right) \cdot \left(\sum_{i=1}^{N-\lambda} C_{i,-1} + \sum_{j=0}^{N-1} C_{-1,j}\right)}{2 \cdot N \cdot \left[\sum_{i=0}^{N-1}(L'_{i,-1} \cdot L'_{i,-1}) + \sum_{j=0}^{N-1}(L'_{-\lambda,j} \cdot L'_{-\lambda,j})\right] - \left(\sum_{i=0}^{N-1} L'_{i,-1} + \sum_{j=0}^{N-\lambda} L'_{-1,j}\right) \cdot \left(\sum_{i=1}^{N-\lambda} L'_{i,-1} + \sum_{j=0}^{N1} L'_{-1,j}\right)} \quad (5)$$

$$\beta = \frac{\left(\sum_{i=0}^{N-1} C_{i,-1} + \sum_{j=0}^{N-1} C_{-1,j}\right) - \alpha \cdot \left(\sum_{i=0}^{N-1} L'_{i,-1} + \sum_{j=0}^{N-1} L'_{-1,j}\right)}{2 \cdot N} \quad (6)$$

FIG. 11 shows an example associated with the location of the top and left neighboring reconstructed samples, which may be used for the derivation of α and β. The neighboring reconstructed samples may be available at the encoder and/or the decoder. The values of α and β may be derived at the encoder and/or the decoder. The values of α and β may or may not need to be signaled.

An input video may be spherically rotated, for example, using up to 3 parameters (e.g., yaw, pitch, and roll). The spherical rotation may be performed prior to encoding. A video coding device may receive the rotation parameters, for example, via a supplemental enhancement information (SEI) message and/or high level syntax (HLS) parameters. The video coding device may perform an inverse spherical rotation (e.g., after decoding and before display the video).

A video coding device may determine spherical rotation parameters using one or more of the following: multi-pass encoding and/or a criterion. A criterion may be used to determine a spherical rotation (e g., optimal spherical rotation). The spherical rotation may be determined and/or applied at the beginning of a video or at regular intervals, e.g., every group of pictures (GOP) or at every intra random access point (IRAP) frame. The spherical rotation may be determined and/or applied to a certain projection format (e.g., any projection format). As described herein, certain projection formats may comprise multiple faces (e g., CMP). As described herein, frame packing layouts, may pack faces with different orientations and/or positions (e.g., a 3×2 layout), which may be equivalent to a rotation of the input video. Different frame packing configurations may have different characteristics and/or coding performances associated with spherical rotation.

The faces of 360° video may be grouped based on, at least in part the rotation of a face. Projection formats, which may be composed of multiple faces, may be packed using groups of neighboring (e.g., spatially neighboring) faces in a 3D geometry. A face group may include one or more neighboring faces (e.g., spatially neighboring faces). For example, a cube based geometry may be packed in a 3×2 layout, e.g., two rows of three faces each. As described herein, the rows may be referred to as face rows, in this example, a face row may be composed of a race group of three faces. There may be multiple (e.g., six different) combinations to select two face groups of three faces. One or more faces may be rotated. For example, when compared to a 4×3 layout (e.g., FIG. 2B), three faces may be rotated (e.g., rotated by 90, 180, or 270 degrees) In the 3×2 layout. Rotating faces may affect coding performance. For example, rotating faces by multiple of 90 degrees may affect intra coding performance.

Face groups may be positioned in a certain manner. Within a given layout face groups may be positioned differently. For example, in a cube based geometry packed in a 3×2 layout, the top and bottom face rows may be swapped. A face row (e.g., each face row) may be rotated by 180 degrees. If a bottom part of a top face row has different motion characteristics than a top part of a bottom face row, the face size may not be a multiple of the CTU size. CU partitioning may be aligned with a boundary. Face rows may be positioned such that the parts on either side of a boundary contains little to no motion.

Frame packing configurations (e.g. face layout and/or face rotation parameters) may be changed for the frames in a 360 video. Frame packing configurations may be determined at the beginning of a sequence or at regular intervals, e.g., for every GOP, for every RAS, and/or at every IRAP frame. Frame packing configurations (e.g., optimal frame packing configurations) may be selected for an update frame (e.g. every update frame). For example an update frame may be an I frame and/or IRAP frame. If the same parameters are selected at every training period, the location of continuous and discontinuous face boundaries may be fixed. Spatially neighboring faces (e.g. two spatially neighboring faces) in a 3D geometry may be discontinuous in a frame packed picture, if there is a reference picture where the face boundary is continuous, prediction may be performed for the areas located near the discontinuous face boundary in the current picture.

A video coding device may adaptively frame pack a video. Adaptive frame packing may be performed based on content analysis. Adaptive frame packing may be performed for projection formats composing one or more faces. The faces in a frame packed picture may be re-arranged. The faces may be rotated, for example, by multiples of 90-degrees. Spherical rotation may be performed by rotating a video by angles (e.g., arbitrary angles), which may involve trigonometric functions, e.g. sine and/or cosine. Adaptive frame packing may be used in conjunction with spherical rotation, which may reduce the parameter space for a spherical rotation search. For example, as described herein, a rotation parameter search range for a spherical rotation search may be reduced (e.g., reduced to ⅛ of the 3D space). Adaptive frame packing may be used to determine the remaining combinations of rotation parameter values. In adaptive frame packing, a video coding device may periodically change and/or update packing configurations periodically (e.g., at regular intervals), which may reduce the visibility of seam artifacts. For example, a video coding device may change and/or update packing configuration at every I frame. The location of continuous and discontinuous face boundaries may be changed between (e.g., between two successive) frame packing configurations.

Frame packing configurations (e.g., face layout and/or face rotation parameters) for 360-degree video coding may be selected based on, for example, content analysis. Content analysis may indicate the orientation (e.g., the optimal orientation) and/or position of a face (e.g., each face in a frame packed picture).

A video coding device may select face groups. Face group selection may consider face rotation. Projection formats, which may include multiple faces, may be packed using groups of neighboring (e.g., spatially neighboring) faces in a 3D geometry. A face group may include neighboring faces (e.g., spatially neighboring faces in a frame packed picture) may be referred to as face groups. For example, a cube-based geometry may be packed in a 3×2 layout e.g., two rows each comprising three faces. As described herein, the rows in a frame packed picture may be referred to as face rows. A face row may comprise a face group of three faces. There may be six different combinations to select two face groups of three faces. When compared to a 4×3 layout (e.g., as seen in FIG. 2B), three faces may be rotated (e.g., rotated by 90, 180, or 270 degrees) in the 3×2 layout. Rotating faces (e.g., by multiples of 90 degrees) may impact coding performance, e.g., in intra coding.

A face group may be positioned such that video coding performance is improved. Within a given layout face groups may be positioned in different ways. For example, in a cube based geometry packed in a 3×2 layout, the top and bottom face rows may be swapped. A face row may be rotated by 180 degrees. Face positioning and face rotation may affect coding performance (e.g., at the discontinuous boundary between the two face rows). The face size may or may not be a multiple of the CTU size. If a bottom part of a top face row has different motion characteristics than a top part of a bottom face row, CU partitioning may be aligned with a boundary. Face rows may be positioned such that the parts on either side of the boundary contains minimal motion (e.g., little to no motion).

Frame packing configurations (e.g., face layout and/or face rotation parameters) may be updated and signaled, for example, periodically. Frame packing configurations may be determined at the beginning of a sequence or at regular intervals, e.g., for every GOP, for every RAS, and/or at every IRAP frame. Frame packing configurations may be selected for an update frame (e.g., every update frame). The frame packing configuration selected for an update frame may be the optimal frame packing parameters. If the same parameters are continually selected (e.g., at every update frame), the location of continuous and discontinuous face boundaries may be fixed. Spatially neighboring faces in a 3D geometry may be discontinuous in a frame packed picture. If a reference picture with a continuous face boundary is used to predict a current picture, prediction (e.g., prediction which may reduce seam artifacts) may be performed for the areas located near the discontinuous face boundary in the current picture.

A picture may be converted from one frame packing configuration (e.g., face layout and/or face rotation parameters) to another frame packing configuration. The faces of a picture may be rotated by an angle. For example, the faces comprised within the coded picture may be rotated by different angles, respectively. Chroma subsampling may be performed on a face. If chroma subsampling is performed, face rotation may affect the prediction of chroma samples. The location of chroma samples may shift in the horizontal and/or vertical directions of a rotated face. Chroma planes may be resampled (e.g., resampled after rotation). Also, or alternatively, different chroma location types may be used. The chroma location types may or may not vary based on the rotation of a face. Techniques associated with chroma sample rotation may be performed.

Face group selection may consider the rotation of a face. For example, in a 3×2 layout, six different combinations of two face groups, each face group comprising three faces, may exist. Table 1 lists exemplary combinations of face groups using the face definitions illustrated in FIG. 2. Certain portions of a spherical video may be easier to code as compared to other portions of the spherical video The combinations where the three faces along the equates are grouped together (e.g., in the same face group) may be considered, and the number of combinations considered may be reduced (e.g., reduced to combinations 1-4 in Table 1).

TABLE 1

Combinations to select two face groups of three faces.

| Combination | Group #1 | Group #2 |
|---|---|---|
| 1 | PX, PZ, NX | PY, NZ, NY |
| 2 | PX, NZ, NX | PY, PZ, NY |
| 3 | PZ, PX, NZ | PY, NX, NY |
| 4 | PZ, NX, NZ | PY, PX, NY |
| 5 | PX, PY, NX | PZ, NY, NZ |
| 6 | PZ, PY, NZ | PX, NY, NX |

The combinations listed in Table 1 may correspond to spherical rotations of 90, 180, or 270 degrees in yaw, pitch, and/or roll. If adaptive frame packing is used in conjunction with spherical rotation, the range of spherical rotations may be an octant of the 3D geometry. For example, the range of spherical rotations may be limited to one octant of the 3D geometry. The spherical rotation parameter search may be reduced, for example, by a factor of 8.

Referring to combinations 1-4 in Table 1, the three equatorial faces in Group 1 may be placed horizontally. The remaining three faces in Group 2 may be rotated in the frame packed picture. Rotations of ±90 degrees may impact coding efficiency (e.g., in intra coding). A pattern may include diagonal lines, e.g., from upper left to lower right. A pattern may include a structure (e.g., a regular structure, such as, a directional gradient) that me be prediction using an intra angular mode. A pattern may include anti-diagonal lines, e.g., from upper right to lower left. Prediction directions close to mode 2 in FIG. 7 may use samples located below and to the left of a current block. Prediction directions close to mode 34 in FIG. 7 may use samples located above and to the right of a current block, respectively. Horizontal gradients may be derived using Equation 7. Vertical gradients may be derived using Equation 8. Diagonal gradients may be derived using Equation 9. Anti-diagonal gradients may be derived using Equation 10. Equations 7-10 may be used to determine face rotation.

$$g_h(i, j) = |2F(i, j) - F(-1, j) - f(i+1, j)| \tag{7}$$

$$g_v(i, j) = |2F(i, j) - F(i, j-1) - F(i, j+1)| \tag{8}$$

$$g_d(i, j) = |2F) - F(i-1, j-1) - F(i+1, j+1)| \tag{9}$$

$$g_a(i, j) = |2F(i, j) - F(i-1, j+1) - F(i+1, j-1)| \tag{10}$$

Figure 12:
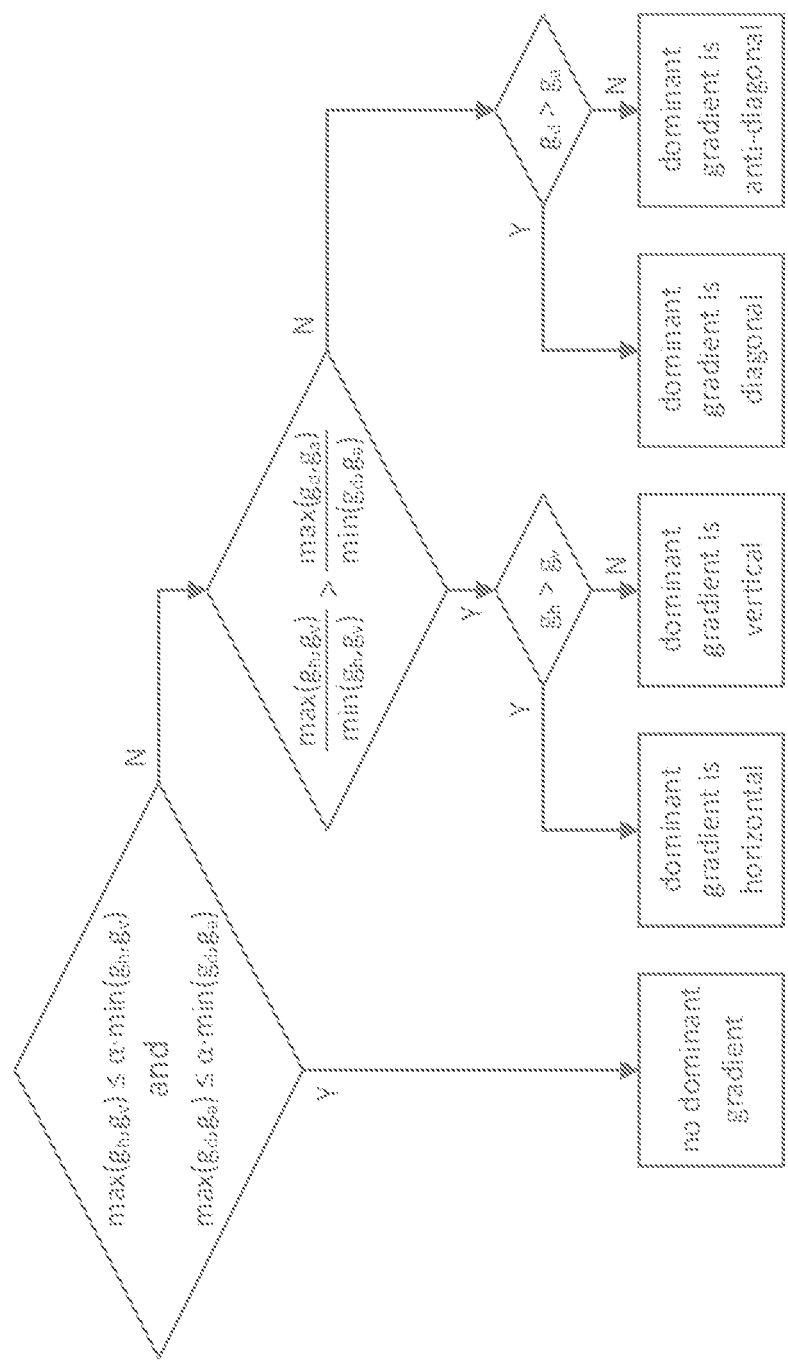
FIG. 12 illustrates an example associated with determining a dominant gradient.
Figure 13A:
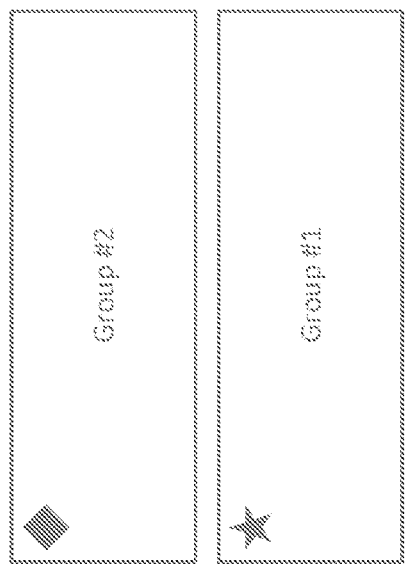
FIGS. 13A-D illustrate exemplary combinations of face group positioning.
Figure 13B:
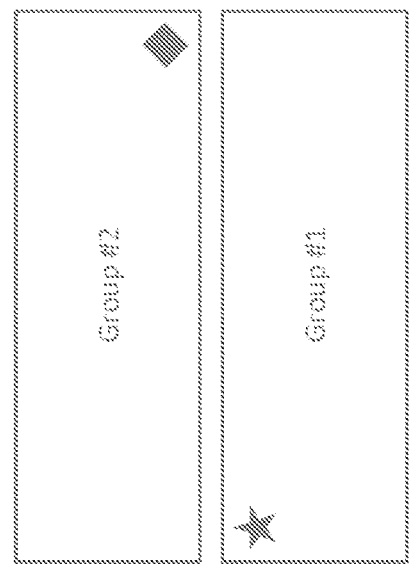
Figure 13C:
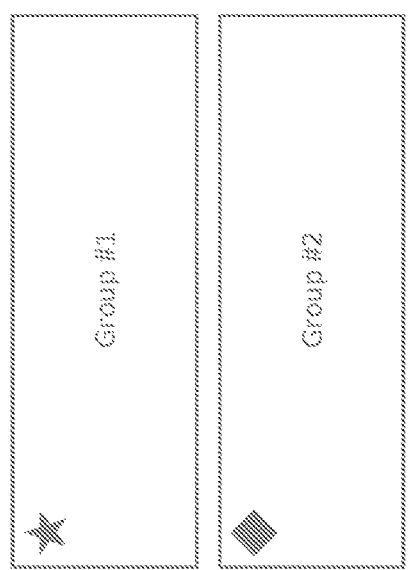
Figure 13D:
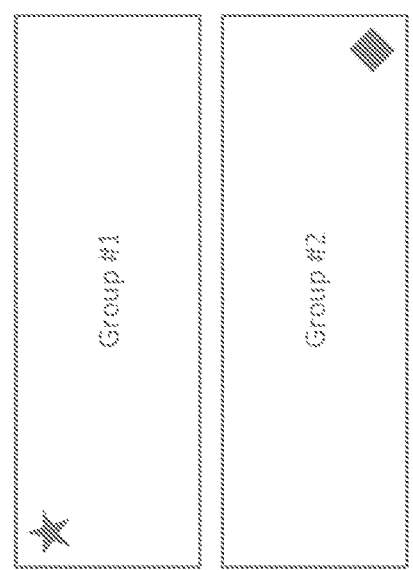

Gradients may be computed over a face. The gradients may be computed at individual sample position of a face. The gradient values at sample positions may be summed together, e.g., to compute the gradients over the whole face. Gradient may be computed on a block basis. For example, a dominant gradient in a block, e.g., each 8×8 block, may be determined. The gradients may be accumulated over the samples within a block. The accumulated gradient values may be compared to one another. For example, a block's dominant gradient may be determined by comparing the accumulated gradient values for the block. FIG. 12 shows an exemplary technique to determine a block's dominant gradient. As seen in FIG. 12, α may be a parameter used to classify between active and inactive gradients.

A cost, for example, a coding cost, may be determined tor a face. The cost of a face may be based on the gradients of the face. For a face, a cost function may be illustrated as:

$$c = w_h g_h + w_v g_v + w_d g_d + w_a g_a \tag{110}$$

Referring to (11), $w_h$, $w_v$, $w_d$, and $w_a$ may be the weights assigned to the accumulated gradients or dominant gradient values. For example, when intra prediction for patterns is composed of anti-diagonal lines, one or more of the following set of weights may be used: $w_h=w_v=w_a=-1$, $w_a=1$.

The overall cost for a combination may be the sum of the individual cost of the faces. For example, referring to Table 1, the cost of each face for a respective combination may be summed together to determine the cost of the combination. The cost calculation of a combination may consider the orientation of a face (e.g., each face). The gradients of a face may not be computed (e.g., recomputed) to account for the different rotations. For example, for a rotation of 90 degrees, the horizontal and vertical directions may be swapped (e.g., vertical becomes horizontal and horizontal becomes vertical). Similarly, the diagonal and anti-diagonal directions may be swapped (e.g., diagonal becomes anti-diagonal and anti-diagonal becomes diagonal) for a rotation of 90 degrees. A combination that yields the lowest cost may be selected.

Gradients may be computed on a luma component. Separate costs may be computed on the luma and the two chroma components. An overall cost may be obtained by aggregating the individual costs from a component. For example, the individual cost of each component may be aggregated using a weighted average.

Face groups may be positioned in a certain manner. Face group positioning may be determined based on, for example, the motion within a face and/or face group.

A face group may be assigned to a row. For example, a face group may be assigned to one of the two rows of a 3×2 layout. Face group assignment may be performed after the two face groups have been selected. A face row may be rotated. For example, if a face row is rotated by 180 degrees the directionality of gradients of the faces within the row may be preserved. A face size may or may not be a multiple of the CTU size. CTUs may cross over face rows. If the characteristics of the parts of a CTU are different, CU partitioning may yield smaller CUs. The partitioned CUs may be aligned with the boundary between the respective face rows, if the characteristics of the two parts of a CTU are similar, larger CUs may be used. For example, the larger CUs may cross the boundary between the two face rows. Coding modes may use sub-CU based motion vector prediction for inter coding. The motion of a large CU may be refined at a finer granularity, e.g., on a 4×4 block basis, which may avoid splits of the large CU into smaller CUs. Large CU refinement may be applied if there is little to no motion. Combinations may be provided where the groups having the three equatorial faces are not rotated by 180 degrees. Exemplary combinations for positioning the two face rows are illustrated in Table 2 and depicted in FIG. 13.

Motion estimation may be performed on a face group. The amount of motion at the top and bottom parts of a face group (e.g., each face group) may be estimated. Face group positioning may be determined based on motion estimation. For example, simple motion estimation, e.g., using a fixed block size and integer-pel only motion compensation, may be performed. A motion vector distribution may be analyzed. A median motion vector may be computed. The difference between frames may be determined. For example, the difference between two frames may be determined by:

$$A_{top}(G) = \sum_{j=0}^{\varepsilon-1} \sum_{i=0}^{W-1} \varphi(G(i, j, t) - G(i+\Delta x, j+\Delta y, t+\Delta t)) \quad (12)$$

$$A_{bottom}(G) = \sum_{j=H-\varepsilon}^{H-1} \sum_{i=0}^{W-1} \varphi(G(i, j, t) - G(i+\Delta x, j+\Delta y, t+\Delta t)) \quad (13)$$

Referring to (12) and (13), may indicate a sample at coordinate (i,j) and time t in a group of size W×H. $\varphi(\cdot)$ may be used to indicate a distance measurement function, e.g., L1- or L2-norm. $(\Delta x, \Delta y)$ may indicate a motion vector that may be equal to (0,0) if motion estimation is not used. $\varepsilon$ and $\Delta t$ may be two parameters that indicate the number of samples and the time difference used in the frame difference computation, respectively. For example, $\varepsilon$ may be set to a multiple of the smallest block size, e.g., 4, 8, 16, etc. $\Delta t$ may be $0<\Delta t<T$, where T may be the adaptive frame packing update period, which may be set to T/2 or the GOP size.

The activity within the top and/or bottom parts of a face group (G1 and G2) may be compared, for example, to select how to position the two face groups (see Table 2).

Face seam artifacts may be visible, for example, in cube-based projection formats. Cube based projection formats may not have a packing configuration where the faces in a frame packed picture are continuous. If neighboring faces in a 3D geometry are not continuous in the frame packed picture, a face seam may be visible. Discontinuous face boundaries in a frame tracked picture may result in a visible face seam.

Frame packing configurations (e.g., face layout and/or face rotation parameters) may be updated periodically and/or aperiodically. For example, frame packing parameters maybe updated periodically or at regular intervals. The updates to the frame packing configurations may modify the location of face boundaries that are continuous or discontinuous, which may modify the location of visible face

TABLE 2

Combinations for positioning the two face groups

| Combination | Top face row | Bottom face row | Condition |
|---|---|---|---|
| 1 | Group #1 | Group #2 | $A_{top}(G1) > A_{bottom}(G1)$ and $A_{top}(G2) < A_{bottom}(G2)$ |
| 2 | Group #1 | Group #2, rotated by 180 degrees | $A_{top}(G1) > A_{bottom}(G1)$ and $A_{top}(G2) > A_{bottom}(G2)$ |
| 3 | Group #2 | Group #1 | $A_{top}(G1) < A_{bottom}(G1)$ and $A_{top}(G2) > A_{bottom}(G2)$ |
| 4 | Group #2, rotated by 180 degrees | Group #1 | $A_{top}(G1) < A_{bottom}(G1)$ and $A_{top}(G2) < A_{bottom}(G2)$ | seams. More geometry edges may be visible (e.g., due to discontinuity of neighboring faces). The geometry edges may be visible for a short time. The frame packing configurations' update period may be short. For example, frame packing configurations (e.g., face layout and/or face rotation parameters) may be updated every: GOP, RAS, intra period, etc.

Figure 14:
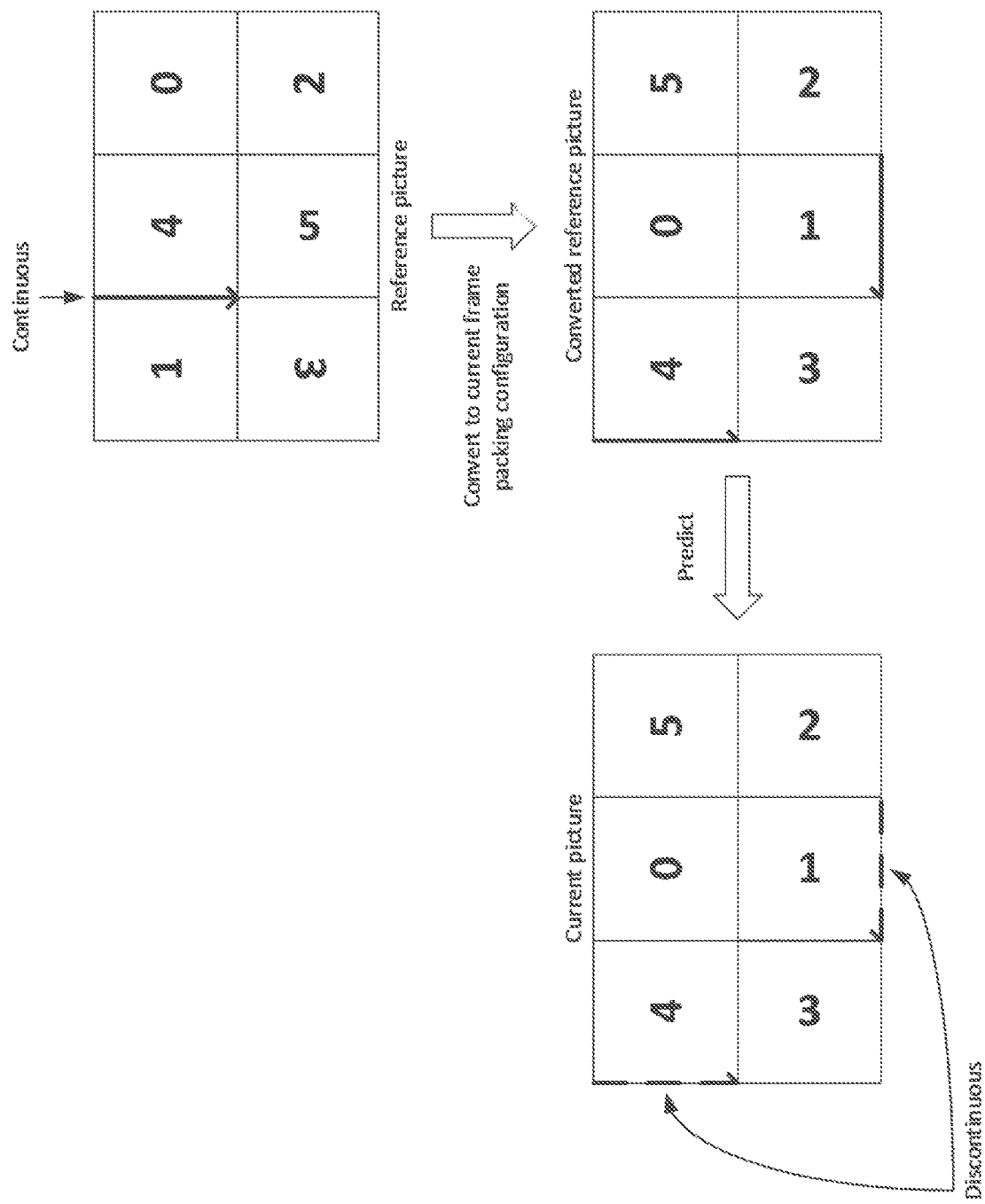
FIG. 14 illustrates an example associated with inter frame prediction.

A reference picture may be identified and used to predict a current picture. The reference picture may mate a discontinuous face boundary in the current picture continuous. For example, if the reference picture is used to predict the current picture, prediction of the current picture may be improved (e.g., for the areas located near the discontinuous face boundary in the current picture). The visibility of seam artifacts for the current picture may be reduced. Considering a 3×2 layout, if the current and reference pictures are packed using the frame packing configurations illustrated in FIG. 14, the face boundary between face #1 and face #4, (e.g. as seen in FIG. 14), may change. For example, as illustrated in FIG. 14. the face boundary between face #1 and face #4 may be discontinuous in the current picture and continuous in the reference picture.

A current picture may be predicted using a reference picture associated with a different frame packing configuration (e.g., face layout and/or face rotation parameters). The reference picture may be used to predict the current picture. The position, rotation, and/or shape of an object in the reference picture may be different from that of current picture. In examples, such as the example illustrated in FIG. 14, a face may be rotated in a reference picture when compared to a current picture. In examples, such as the example illustrated in FIG. 14, a face may be placed in a different position in a reference picture when compared to a current picture. The difference in position between a face in the current picture and the face in the reference picture may be large (e.g., larger than the maximum search range used for motion compensation). In examples, the 3D geometry may be rotated. If the 3D geometry is rotated, objects in the projected faces of a reference picture may be warped when compared to a current picture, which may affect temporal correlation. The frame packing configurations (e.g., face layout and/or face rotation parameters) of the reference picture may be converted, for example, to align with the frame packing configurations of the current picture. For example, the reference picture may be converted to the current picture's frame packing configuration before prediction is applied.

Figure 15:
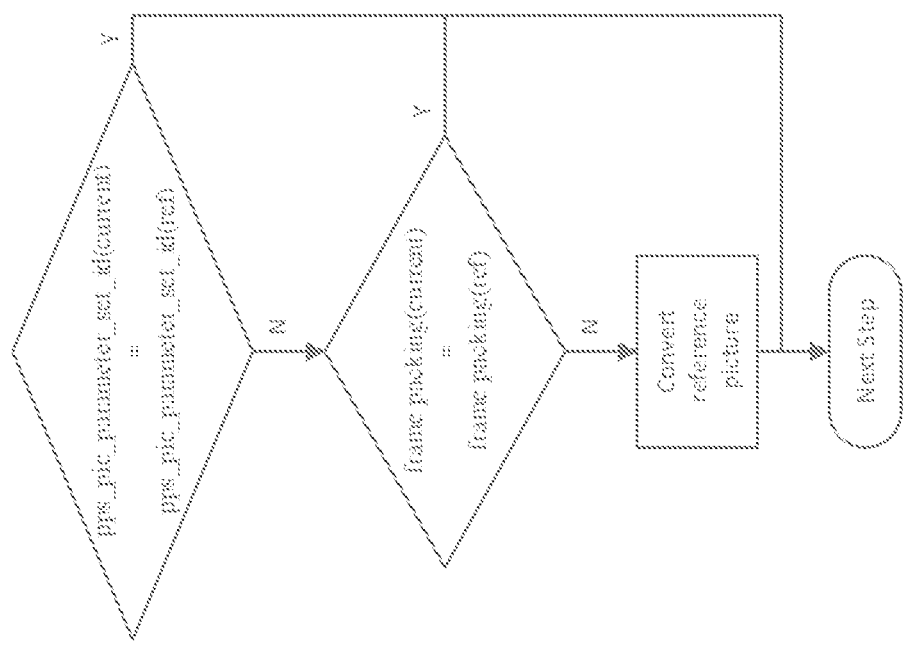
FIG. 15 illustrates an example associated with reference picture conversion.

As described herein, the frame packing configurations of a reference picture and the frame packing configurations of a current picture may be different. It may be determined whether the frame packing configuration (e.g., the frame packing and/or the spherical rotation parameters) of a current picture and/or a reference picture differ. A picture parameter set (PPS) id (e.g., pps_pic_parameter_set_id) may be determined for the current picture and the reference picture. The PPS id(s) of the current picture and the reference picture may be compared. If the PPS id(s) of current picture and the reference picture are the same, the frame packing configuration of the current picture and the reference picture may be determined to be the same. If the PPS id(s) of the current picture and the reference picture are not the same, the frame packing configuration associated with the current picture and the reference picture may be compared. For example, the frame packing configurations of the current picture anti the reference picture may each be compared separately. FIG. 15 illustrates an example associated with determining whether the frame packing configuration (e.g., frame packing, and/or spherical rotation parameters) of a reference picture are to be converted.

One or more PPS sets with different parameter values may use the same PPS id. When a subsequent PPS set has the same PPS id as a previous PPS set, the contents of the subsequent PPS set may replace the contents of a previous PPS set. A bitstream conformance constraint may be imposed to disallow a PPS set to use the same PPS id as another PPS set (e.g., if two PPS sets use different frame packing arrangements). Frame packing configurations (e.g., frame packing and/or spherical rotation parameters) may be signaled, e.g., in a high level syntax structure other than the PPS. For example, frame packing configurations may be signaled in an adaptation parameter set (APS) and/or a slice header.

Face group selection may impact the continuity of a face boundary. A subset of the possible combinations (e.g., see Table 1) may be used, which may affect the number of continuous faces. A cost may be determined for each of the face group combinations. In an example, a combination with the lowest cost may be selected.

Frame packing configurations (e.g., face layout and/or face rotation parameters) may be updated. For example, for an update period (e.g., every, GOP, RAS, and/or IRAP), the possible combinations (see Table 1) may be tested and ranked (e.g., based on their respective cost). A frame packing configuration (e.g., the highest ranked configuration) that differs from the frame packing configuration used in a previous update period may be used. Frame packing configurations (e.g., face layout and/or face rotation parameters) may depend on the frame packing configuration of a previous update period (e.g., a previous GOP, RAS, and/or IRAP). Two out of the four frame packing configurations may be selected.

Parallel encoding may be performed. A frame (e.g., the first frame of a video sequence, GOP, RAS, etc.) may be used to rank the different frame packing configuration combinations based on their cost. The ranked combinations may be referred to as C1, C2, C3, C4. For a frame (e.g., the first frame), the highest ranked combination, e.g., C1, may be used. For the following update frames, two sets of combinations may be formed, e.g., {C1, C2} and {C3, C4}. A combination (e.g., an optimal combination) may be determined by:

$$C_{opt} = \begin{cases} \arg\min_{\{C1,C2\}} c & \text{if } t \% 2T = 0 \\ \arg\min_{\{C3,C4\}} c & \text{otherwise} \end{cases} \quad (14)$$

Referring to (14): T may indicate the adaptive frame packing update period, % may be the modulo operator, and C may be the cost function computed for an update frame.

Face rotation parameters (e.g., spherical rotation parameters) for 360-degree video coding may be selected based on, for example, content analysis. A content analysis may indicate a spherical rotation (e.g., an optimal spherical rotation).

Spherical rotation may affect the properties of a frame packed picture. A straight line in 3D space may be affected by spherical rotation of a face (e.g., face rotation) in a frame packed picture and/or a cube-based projection format with uneven sampling (e.g., EAC, ACP, and/or HCP). For example, the straight line in the frame packed picture may be projected as a straight fine using one spherical rotation and may not be projected as a straight fine using another spherical rotation. A spherical rotation that minimizes geometrical distortions may be selected. For example, a spherical rotation that straightens tines may be selected. Content analysis may be performed to measure the curvature of a line in a face. Consent analysis may include edge detection and/or the use of a Hough transform.

Edge detection may be performed on a face. Edge detection may be used to indicate structures (e.g., the main structures) within a face. For example, edge detection may include gradient and/or Laplacian based edge detection methods, e.g., Sobel, Robert, Prewitt, or Canny. Filtering may be applied (e.g. applied prior to the edge detection), for example, to remove noise. Edge detection may be performed on luma components. Edge detection may be performed (e.g., may alternatively, additionally, and/or separately be performed) on the luma and the chroma components. An edge map (e.g., a final edge map) may be determined, for example, by aggregating the individual edge maps from a component (e.g., each component). Individual edge maps may be aggregated using, for example, a weighted average of the individual edge maps.

A Hough transform may be applied to (e.g., computed on) an edge map to identify lines (e.g., the main lines) in a face. The Hough transform may use a two-dimensional array, e.g., Hough space accumulator, to quantize the Hough parameter space and to detect the existence of a line. Hough space accumulators may correspond to different spherical rotations and/or may be analyzed to select a spherical rotation (e.g., the optimal spherical rotation). For example, a spherical rotation that minimizes the number of peaks in the Hough space accumulator and/or maximizes the intensity of these peaks may be selected.

Frame packing configurations (e.g., face layout and/or face rotation parameters) may be signaled at the sequence and/or picture level (e.g., using HLS elements).

Figure 16B:
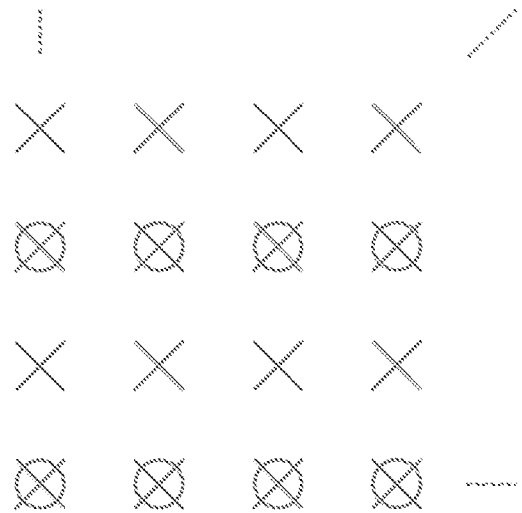
FIGS. 16A-16C illustrates examples associated with the luma and chroma samples of a picture.
Figure 16C:
Figure 16A:
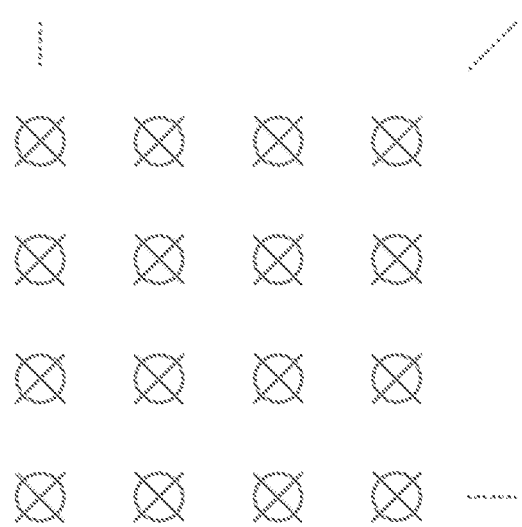

A face may be rotated. Face rotation may affect the location of chroma samples. A picture may be encoded using one or more chroma sampling formats. FIG. 16 illustrates exemplary nominal vertical and horizontal locations of luma and chroma samples in a picture. As illustrated in FIG. 16, the picture may be encoded in one or more chroma sampling formats: FIG. 16A depicts a 4:4:4 chroma sampling format, FIG. 16B depicts a 4:2:2 chroma sampling format, and FIG. 16C illustrates a 4:2:0 chroma sampling format. Referring to FIGS. 16A-16C, the crosses represent the location of luma sample and the circles represent the location of chroma samples. Referring to FIG. 16C, a type-0 chroma sample location is illustrated as an example.

FIGS. 17A-17D illustrate exemplary nominal sample locations of chroma samples in a 4:2:0 chroma format with chroma sample type 0 after rotation. Referring to FIGS. 17A-17D, the crosses represent the locations of luma samples and the circles represent the locations of chroma samples. FIG. 17A illustrates the nominal sample locations. FIG. 17B illustrates the locations of chroma samples after 90° of counter-clockwise rotation. FIG. 17C illustrates the locations of chroma samples after 180° of counter-clockwise rotation. FIG. 17D illustrates the locations of chroma samples after 270° of counter-clockwise rotation.

Figure 18B:
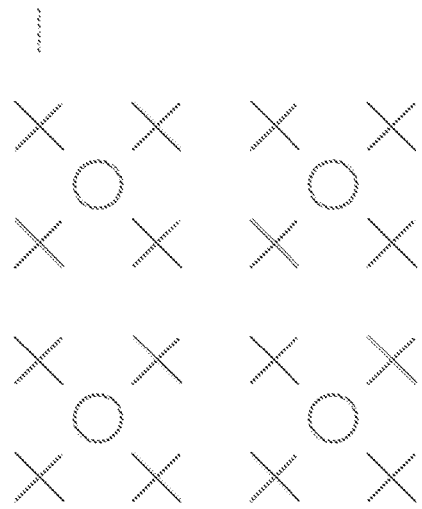
FIGS. 18A-18D illustrates examples associated with the luma and chroma samples of a picture.
Figure 18D:
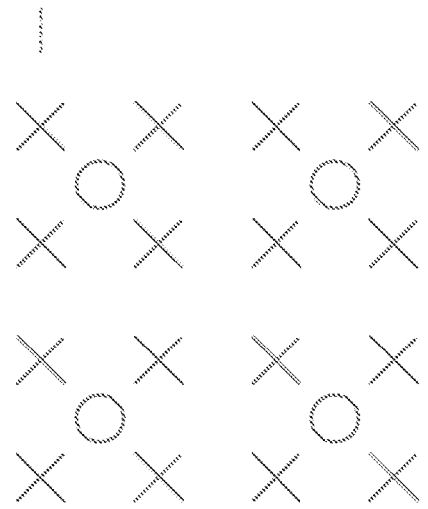
Figure 18A:
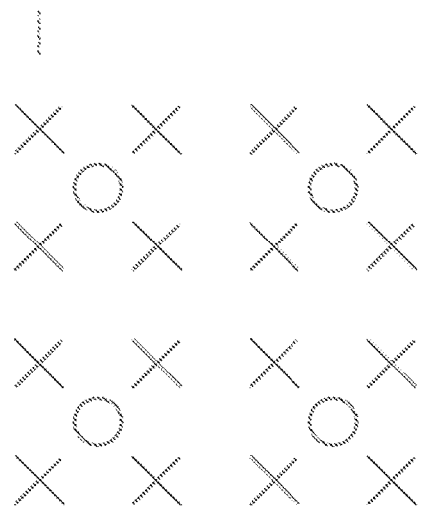
Figure 18C:
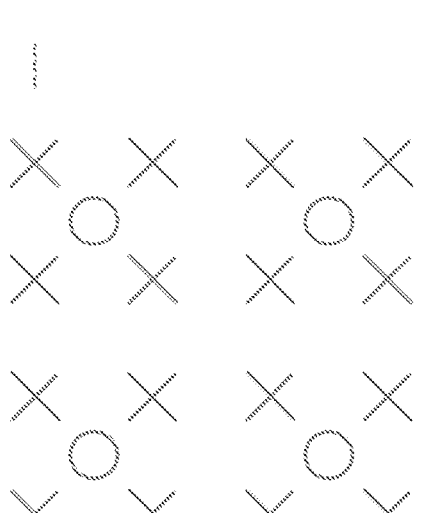

FIGS. 18A-18D illustrate exemplary nominal sample locations of chroma samples in a 4:2:0 chroma format with chroma sample type 1 after rotation. Referring to FIGS. 18A-18D, the crosses represent the location of luma sample and the circles represent the location of chroma samples. FIG. 18A illustrates the nominal sample locations. FIG. 18B illustrates the locations of chroma samples after 90° of counter-clockwise rotation. FIG. 18C illustrates the locations of chroma samples after 180° of counter-clockwise rotation FIG. 18D illustrates the locations of chroma samples after 270° of counter-clockwise rotation.

Figure 19A:
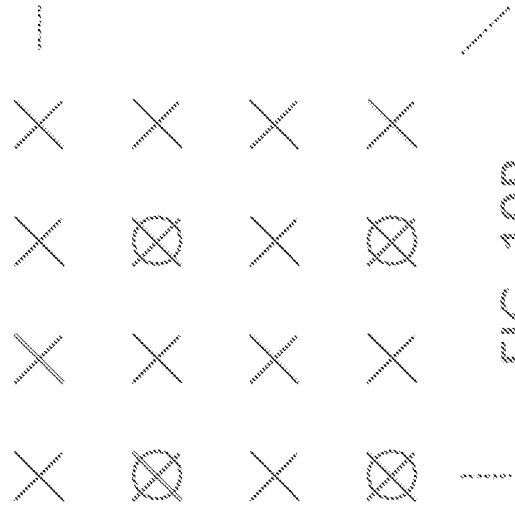
FIGS. 19A-19D illustrates examples associated with the luma and chroma samples of a picture.
Figure 19B:
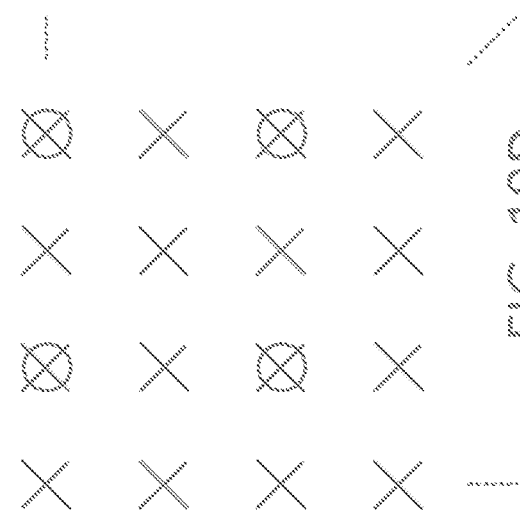
Figure 19C:
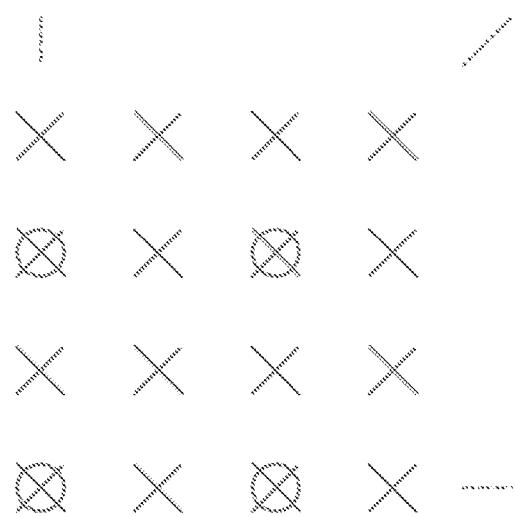
Figure 19D:
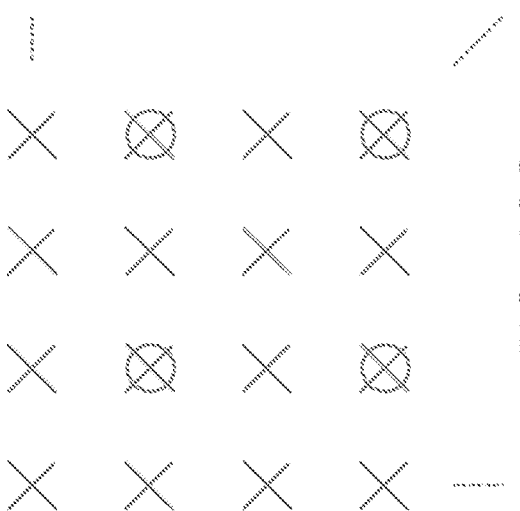

FIGS. 19A-19D illustrate exemplary nominal sample locations of chroma samples in a 4:2:0 chroma format with chroma sample type 2 after rotation. Referring to FIGS. 19A-19D, the crosses represent the location of luma sample and the circles represent the location of chroma samples. FIG. 19A illustrates the nominal sample locations. FIG. 19B illustrates the locations of chroma samples after 90° of counter-clockwise rotation. FIG. 19C illustrates the locations of chroma samples after 180° of counter-clockwise rotation. FIG. 19D illustrates the locations of chroma samples after 270° of counter-clockwise rotation.

Figure 20B:
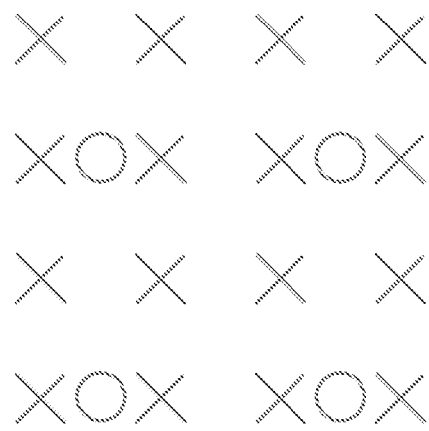
FIGS. 20A-20D illustrates examples associated with the luma and chroma samples of a picture.
Figure 20D:
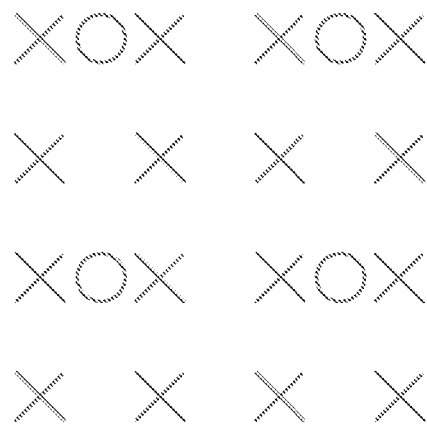
Figure 20A:
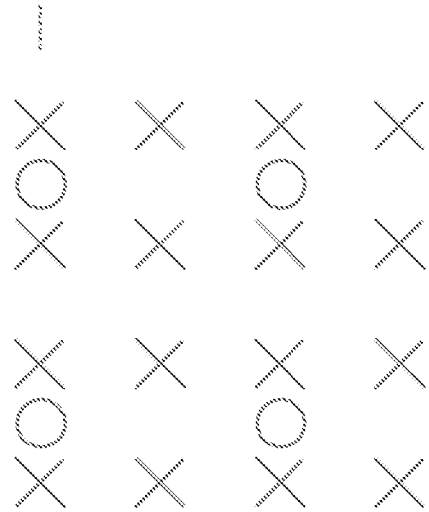
Figure 20C:
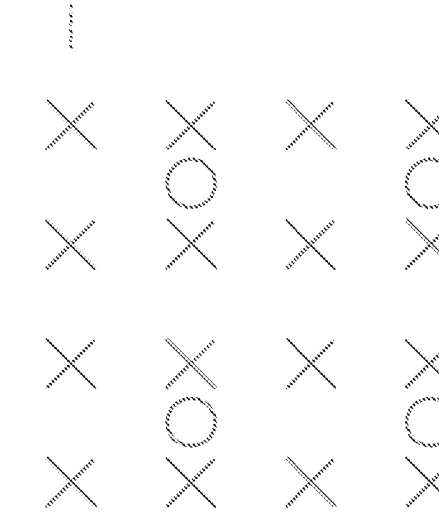

FIGS. 20A-20D illustrate exemplary nominal sample locations of chroma samples in a 4:2:0 chroma format with chroma sample type 3 after rotation. Referring to FIGS. 20A-20D, the crosses represent the location of luma sample and the circles represent the location of chroma samples. FIG. 20A illustrates the nominal sample locations. FIG. 20B illustrates the locations of chroma samples after 90° of counter-clockwise rotation. FIG. 20C illustrates the locations of chroma samples after 180° of counter-clockwise rotation FIG. 20D illustrates the locations of chroma samples after 270° of counter-clockwise rotation.

As described herein, with respect to a 4:2:0 chroma sampling format. FIGS. 17A, 18A, 19A, and 20A illustrate the exemplary locations of chroma samples for common chroma sample types 0, 1, 2, and 3, respectively. As described herein, a coded face may be rotated, for example, to convert the frame packing arrangement of a reference picture. The locations of chroma samples may or may not become misaligned after rotation of a coded face. For example, the locations of chroma samples remain aligned when the chroma sampling format is 4:4:4. Also, or alternatively, the location of chroma sample may become misaligned when the chroma sampling format is 4:2:2 and/or 4:2:0. Chroma sample misalignment may depend on, for example, the degrees of rotations and/or the direction of rotation.

Figure 21A:
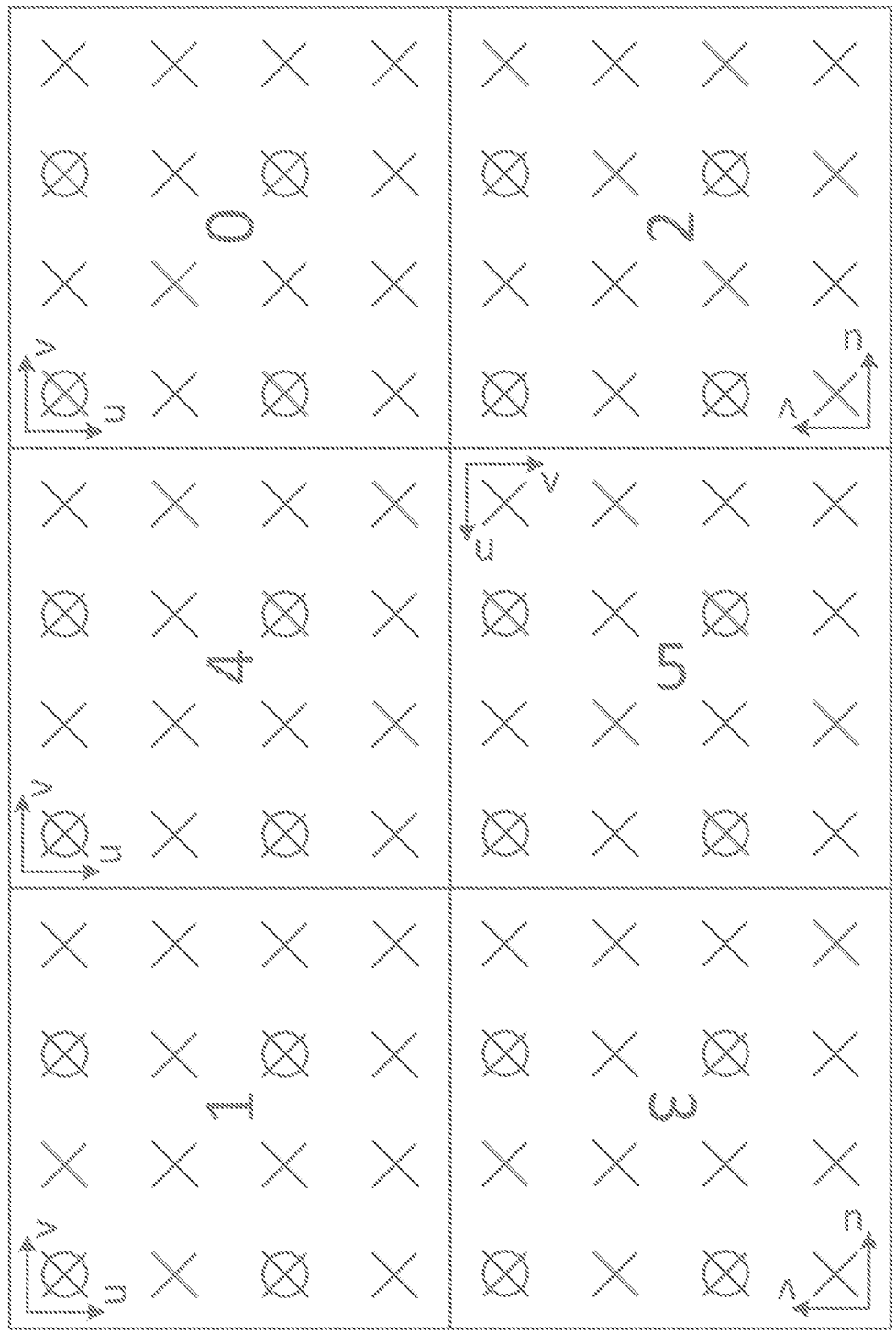
FIGS. 21A-21B illustrates examples associated with the chroma sample of a picture before and after face rotation.
Figure 21B:
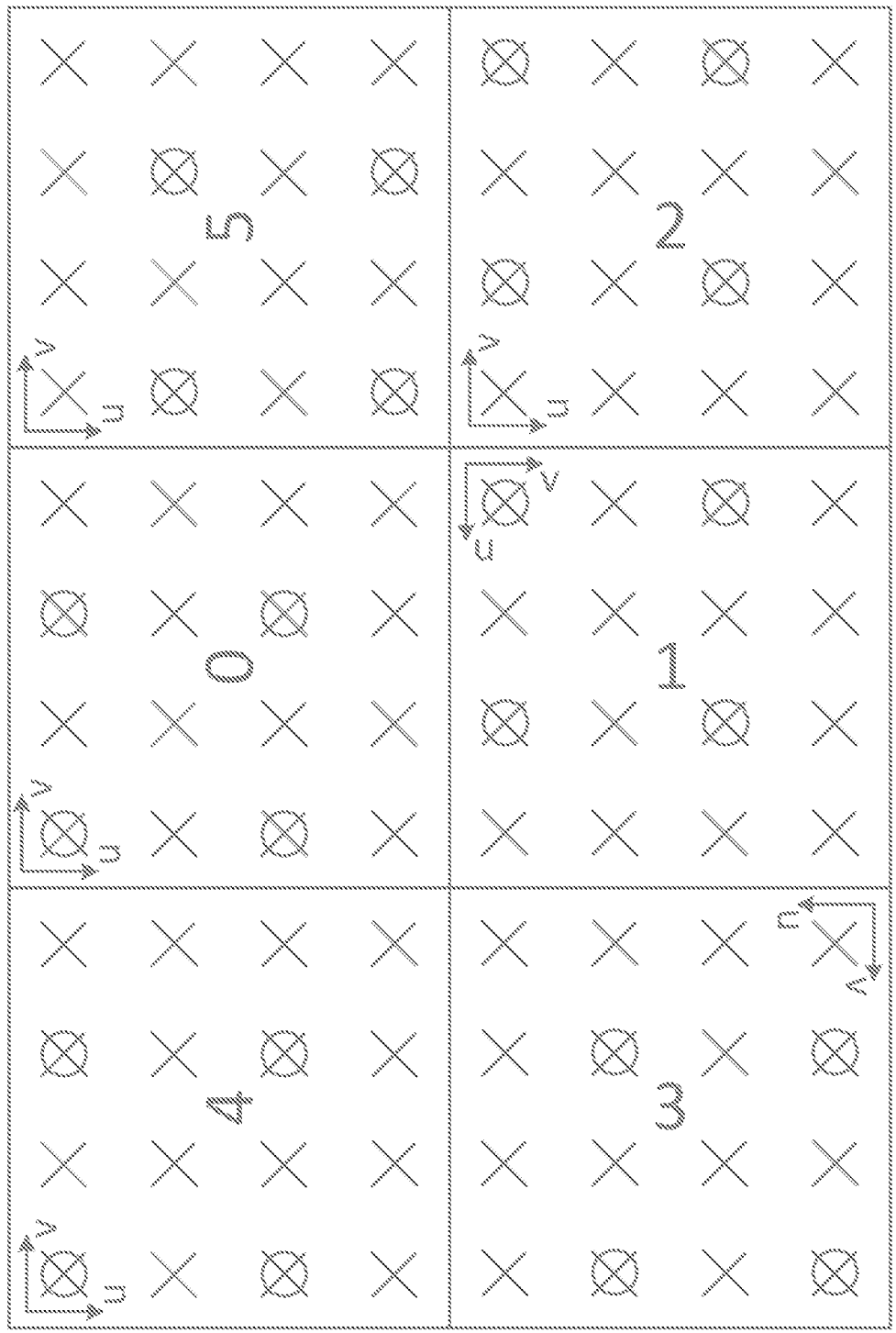

Chroma sample locations may be aligned with luma sample locations. For example, chroma sample locations may be aligned with luma sample locations when a 4:4:4 chroma sampling format is used). FIGS. 21A-21B illustrates the exemplary location of the chroma samples in a reference picture. FIGS. 21A-21B illustrates the location of chroma samples in a reference picture of the exemplary scenarios illustrated in FIG. 14. Referring to FIGS. 21A-21B, reference pictures may use a chroma sample type 2. FIG. 21A illustrates the exemplary location of the chroma samples in a reference picture before frame packing conversion. FIG. 21B illustrates exemplary locations of chroma samples in a reference picture after frame packing conversion. As illustrated in FIG. 21A, the chroma samples within a face may be collocated (e.g., co-sited) with the top left luma sample in the reference picture. As illustrated m FIG. 21b, for example, after frame packing conversion, the location of the chroma samples within a face may not be collocated (e.g., co-sited) with the top left luma sample in the converted reference picture. A scenario where the location of chromas sample within a face are not collocated (e.g., co-sited) with the top left luma sample in a converted reference picture may be referred to as chroma sample misalignment.

Chroma sample misalignment may tie reduced or avoided. Chroma planes may be re-sampled, such that the chroma locations in the re-sampled picture correspond with those defined in the original picture (e.g., the picture before rotation). For example, chroma planes may be re-sampled after rotation. One or more interpolation filters may be used for resampling, e.g., bilinear, bicubic, Lanczos, spline, and/or DCT-based interpolation filters.

A chroma sample type may or may not be affected by face rotation. A chroma sample type that is not affected by rotation (e.g. , rotations by multiples of 90°) may be used resample chroma components and/or to the frames of a 360-degree video. A chroma sample type that is not affected by rotation (e.g., rotations by multiples of 90°) may be used to avoid chroma sample misalignment (e.g., in a 4:2:0 chroma format). As illustrated in FIGS. 17, 19, and 20, respectively, the location of chroma samples for chroma sample types 0, 2, and/or 3 may be affected by rotation (e.g., rotations of 90°, 180°, and 270° counter-clockwise). As illustrated in FIG. 18, chroma sample type 1 may not be affected by rotation (e.g., rotations of 90°, 180°, and 270° counter-clockwise). As illustrated in FIG. 18, a chroma sample may be located at the center of one or more (e.g., four) luma samples. Chroma sample type 1 may be used (e.g., in a 4:2:0 chroma sample format).

Luma samples may be down sampled (e.g., in CCLM prediction). Down sampled luma values may be used as predictors of chroma samples. The down sampling process may account for the chroma location type. The down sampling process may predict chroma samples. The down sampling process may include the use of a down sampling filter. A down sampling filter may assume a chroma sample type 0 Eq. (4) is an example down sampling filter. Eq. (4) may be rewritten using a convolution operation, as illustrated in Eq. (15). Eq. (15) may use a convolution kernel $c_{k,l}$, as illustrated in Eq. (16). As described herein, the convolution kernels may vary (e.g., depending on the chroma sample type). With respect to Eq. (16)-(26) the coefficient $c_{0,0}$ is indicated by a star (*).

$$L'_{i,j} = \frac{1}{\Sigma_k \Sigma_l c_{k,l}} \sum_k \sum_l c_{k,l} \cdot L_{2 \cdot i+k, 2 \cdot j+l} \quad (15)$$

$$c_{k,l} = \begin{bmatrix} 1 & 2^* & 1 \\ 1 & 2 & 1 \end{bmatrix} \quad (16)$$

The convolution kernel $c_{k,l}$ may be replaced by the convolution kernel illustrated in Eq. (17) and/or Eq. (18) (e.g., for chroma sample type 3).

$$c_{k,l} = \begin{bmatrix} 1 & 1 \\ 2^* & 2 \\ 1 & 1 \end{bmatrix} \quad (17)$$

$$c_{k,l} = [1 \ 3^* \ 3 \ 1] \quad (18)$$

The convolution kernel $c_{k,l}$ may be replaced by another convolution kernel, such as the convolution kernels illustrated in Eq. (19)-(22) (e.g., for chroma sample type 1).

$$c_{k,l} = \begin{bmatrix} 1^* & 1 \\ 1 & 1 \end{bmatrix} \quad (19)$$

$$c_{k,l} = \begin{bmatrix} 1 & 3^* & 3 & 1 \\ 1 & 3 & 3 & 1 \end{bmatrix} \quad (20)$$

$$c_{k,l} = \begin{bmatrix} 1 & 1 \\ 3^* & 3 \\ 3 & 3 \\ 1 & 1 \end{bmatrix} \quad (21)$$

$$c_{k,l} = \begin{bmatrix} 0 & 1 & 1 & 0 \\ 1 & 6^* & 6 & 0 \\ 1 & 6 & 6 & 1 \\ 0 & 1 & 1 & 0 \end{bmatrix} \quad (22)$$

The convolution kernel $c_{k,l}$ may be replaced by yet another convolution kernel, such as the convolution kernels illustrated in Eq. (23)-(26) (e.g., for chroma sample type 2).

$$c_{k,l} = [1 \ 2^* \ 1] \quad (23)$$

$$c_{k,l} = \begin{bmatrix} 1 \\ 2^* \\ 1 \end{bmatrix} \quad (24)$$

$$c_{k,l} = \begin{bmatrix} 0 & 1 & 0 \\ 1 & 4^* & 1 \\ 0 & 1 & 0 \end{bmatrix} \quad (25)$$

$$c_{k,l} = \begin{bmatrix} 1 & 2 & 1 \\ 2 & 4^* & 2 \\ 1 & 2 & 1 \end{bmatrix} \quad (26)$$

Down sampling filters, e.g., bilinear, bicubic, Lanczos, spline, or OCT-based interpolation filters, may be used for down sampling. The down sampling filters may be applied considering the chroma sample type of the input signals. The down sampling filter may account for the chroma offsets in the vertical and/or horizontal directions. The down sampling filters may use a weight for the luma samples. The weight of a down sampling filter for luma samples may be based on the chroma sample type. The chroma sample type may be signaled in the bitstream. The signaled chroma sample types may be used to perform prediction (e.g., CCLM perdition). The chroma sample type may be used to determine the down sampling filter. The chroma sample type may be used to determine the chroma offsets in the vertical and/or horizontal directions. The chroma sample type may be signaled at the sequence level, for example, using a syntax. Table 3 illustrates an example syntax, which may be used to signal the chroma sample type.

TABLE 3

Video parameter set

| | Descriptor |
|---|---|
| video_parameter_set_rbsp( ) { | |
| ... | |
| chroma_format_idc | u(1) |
| chroma_loc_info_present_flag | u(1) |
| if(chroma_loc_info_present_flag ) | |
|     chroma_sample_loc_type | ue(v) |
| ... | |
| } | |

Referring to Table 3, a parameter, such as, chroma_format_idc may he used to indicate the chroma sampling relative to the luma sampling (e.g., as specified in Table 4). The value of chroma_format_idc may be in the range of 0 to 3, inclusive. Table 4 illustrates an example relationship between a parameter used to indicate the chroma sampling relative to the luma sampling, such as, chroma_format_id, and the derived chroma format.

TABLE 4

Chroma format derived from chroma_format_idc

| chroma_format_idc | Chroma format |
|---|---|
| 0 | Monochrome |
| 1 | 4:2:0 |
| 2 | 4:2:2 |
| 3 | 4:4:4 |

Referring to Table 3, a parameter, such as, chroma_loc_info_present_flag, may indicate whether chroma sample location information is present. For example, when chroma_loc_info_present_flag is equal to 1, the chroma_sample_loc_type may be present. When chroma_loc_info_present_flag is equal to 0 it the chroma_sample_loc_type may not be present.

Referring to Table 3 and/or or Table 4, one or more of the following may apply. When chroma_format_idc is not equal to 1, a parameter, such as, chroma_loc_info_present_flag, may be equal to 0. A parameter such as, chroma_sample_loc_type, may be used to indicate the location of chroma samples. One or more of the following may apply. If chroma_format_idc is equal to 1 (e.g., as illustrated in Table 4 indicating that a 4:2:0 chroma format is used), chroma_sample_loc_type may indicate the location of chroma samples, which may be similar to the location illustrated in FIG. 17A. If chroma_format_idc is not equal to 1, the value of a parameter, such as, chroma_sample_loc_type may be ignored. When chroma_format_idc is equal to 2 (e.g., as illustrated in Table 4 indicating that a 4:2:2 chroma format) and/or 3 (as illustrated in Table 4 indicating that a 4:4:4 chroma format), the location of chroma samples may be similar to the locations illustrated in FIG. 16. When chroma_format_idc is equal to 0 (e.g., as illustrated in Table 4 indicating that the chroma format is monochrome), a chroma sample array may not be signaled.

As an example, Table 3 assumes that VPS is used to carry the chroma sample type information. A syntax structure similar to Table 3 may be carried in other high level parameter sets, such as the SPS and/or the PPS. For a given value of chroma_sample_loc_type, one or more CCLM filters may be used to perform CCLM. If more than one CCLM filters is applied, the CCLM filter to be applied for a chroma_sample_loc_type may be signaled, respectively. The CCLM filter may be signaled along with chroma_sample_loc_type (e.g., in the VPS, SPS, and/or PPS).

Table 5 illustrates an example syntax, which may be used to signal the chroma sample type. The chroma sample type may be based on a flag, for example, a CCLM enabling flag.

TABLE 5

| Sequence parameter set | Descriptor |
|---|---|
| seq_parameter_set_rbsp( ){ | |
| ... | |
| lm_chroma_enabled_flag | u(1) |
| if( lm_chroma_enabled_flag ){ | |

TABLE 5-continued

| Sequence parameter set | Descriptor |
|---|---|
| chroma_loc_info_present_flag | u(1) |
| if( chroma_loc_info_present_flag ) | |
| chroma_sample_loc_type | ue(v) |
| } | |
| ... | |
| } | |

Referring to Table 5, one or more of the following may apply. A parameter, such as, lm_chroma_enabled_flag, may indicate whether CCLM prediction is to be used for chroma intra prediction. If the lm_chroma_enabled_flag is equal to 0, the syntax elements of a sequence (e.g., the current sequence) may be constrained such that CCLM prediction is not used in decoding of a picture (e.g., the current picture). If the lm_chroma_enabled_flag is not equal to 0, CCLM prediction may be used in decoding of a picture (e.g., the current picture). Also, or alternatively, the lm_chroma_enabled_flag may not be present (e.g., not signaled and/or not set). If the lm_chroma_enabled_flag is not present, the value of lm_chroma_enabled_flag may be inferred to be equal to 0. SPS may be used to carry the CCLM prediction enabling information. A syntax structure similar to the example illustrated in Table 5 may be earned in other high level parameter sets, such as, the PPS.

The chroma sample type may be defined in a frame packed picture. The chroma sample type may be defined using a face coordinate system. If the chroma sample type is defined using a face coordinate system, the equivalent position of the chroma samples for a particular face in the frame packed picture may be determined from the chroma sample type and/or the face's rotation in the frame packed picture. As described herein, the chroma sample type may be signaled in the high level syntax. The face rotation may be signaled in the frame packing configuration. For example, if a face is rotated by 270° counter-clockwise in the frame packed picture and/or a chroma sample type 0 is used in the face coordinate system, a chroma sample in the frame packed picture may be collocated (e.g., co-sited) with the top-left luma sample vertically and/or horizontally shifted by 0.5 unit of luma sample (e.g., as illustrated in FIG. 17D), which may correspond to chroma sample type 3 for that face in the frame packed picture. The down sampling filters may be adjusted for each face in the frame packed picture considering the face's rotation (e.g., for CCIM prediction). The face to which the luma sample belongs to may be determined (e.g., for each luma sample used in CCLM prediction). The down sampling filler may be selected based on the identified face, the amount and/or direction of rotation, and/or the signaled chroma sample type. Also, or alternatively, the chroma sample type may be signaled for a face (e.g., signaled for each individual face) in the frame packing parameters.

As used herein, 360-degree videos may include omnidirectional videos, spherical videos, six degree of freedom (6DoF) media, monoscopic and stereoscopic (3D) virtual reality videos, and/or the like.

Figure 22A:
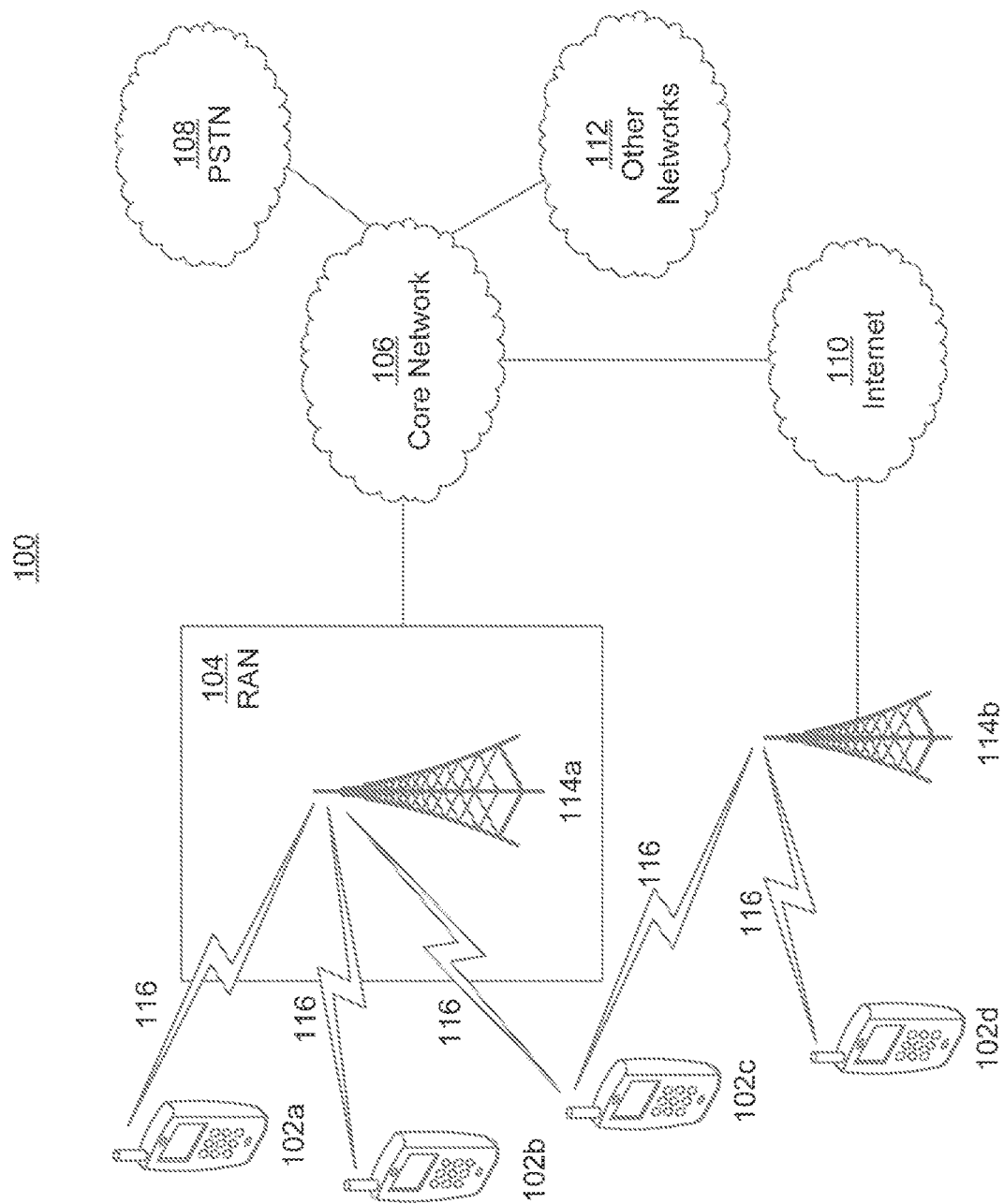
FIG. 22A is a system diagram of an example communications system in winch one or more disclosed embodiments may fee implemented.

FIG. 22A is a diagram illustrating an example communications system 100 in which one or more of the disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 22A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a persons computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a. 114b may be any type of device configured to wirelessly interface with at least one of the WTRUs 102a, 102b, 102c, 102d to facilitate access to one or more communication networks, such as the CN 106/115. the internet 110, and/or the other networks 112. By way of example, the base stations 114a, 114b may he a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 118 using New Radio (NR).

In an embodiment the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 22A may be a wireless router, Home Node B, Home (c)Node B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 22A, the base station 114b may have a direct connection to the Internet 110. Thus, the base station 114b may not be required to access the Internet 110 via the CN106/115.

The RAN 104/113 may be in communication with the CN 106/115, which may be any type of network, configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like The CN 106/115 may provide call control, billing services, mobile location-based services, pre-paid calling, Internet connectivity, video distribution, etc., and/or perform high-level security functions, such as user authentication. Although not shown in FIG. 22A, it will be appreciated that the RAN 104/113 and/or the CN106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS. CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Figure 22B:
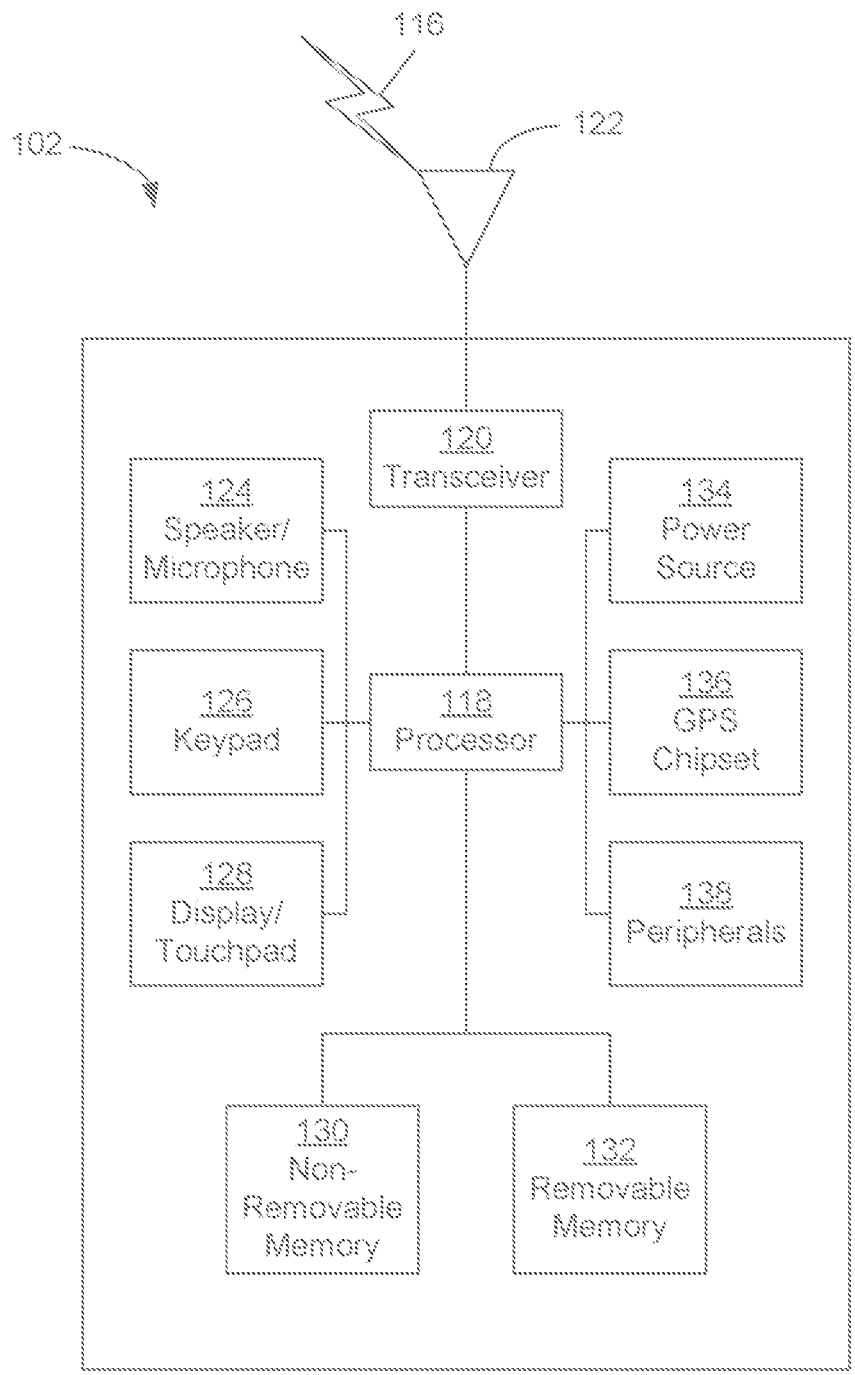
FIG. 22B is a system diagram of an example wireless transmit/receive unit (WTRU) that may be used within the communications system illustrated in FIG. 22A.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 22A may be configured to communicate with the base station 114a, which may employ a cellular-based radio technology, and with the base station 114b, which may employ an IEEE 802 radio technology FIG. 22B is a system diagram illustrating an example WTRU 102. As shown in FIG. 22B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs). Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment The processor 118 may be coupled to the transceiver 120, which may be coupled to the transmit/receive element 122. While FIG. 22B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 22B as a single element, the WTRU 102 may include any number of transmit/receive elements 122. More specifically, the WTRU 102 may employ MIMO technology. Thus, in one embodiment the WTRU 102 may Include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like, in other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations, it will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either UL (e.g., for transmission) or the downlink (e.g., for reception). A video coding device may include a WTRU, such as, for example, the WTRU 102.

Figure 22C:
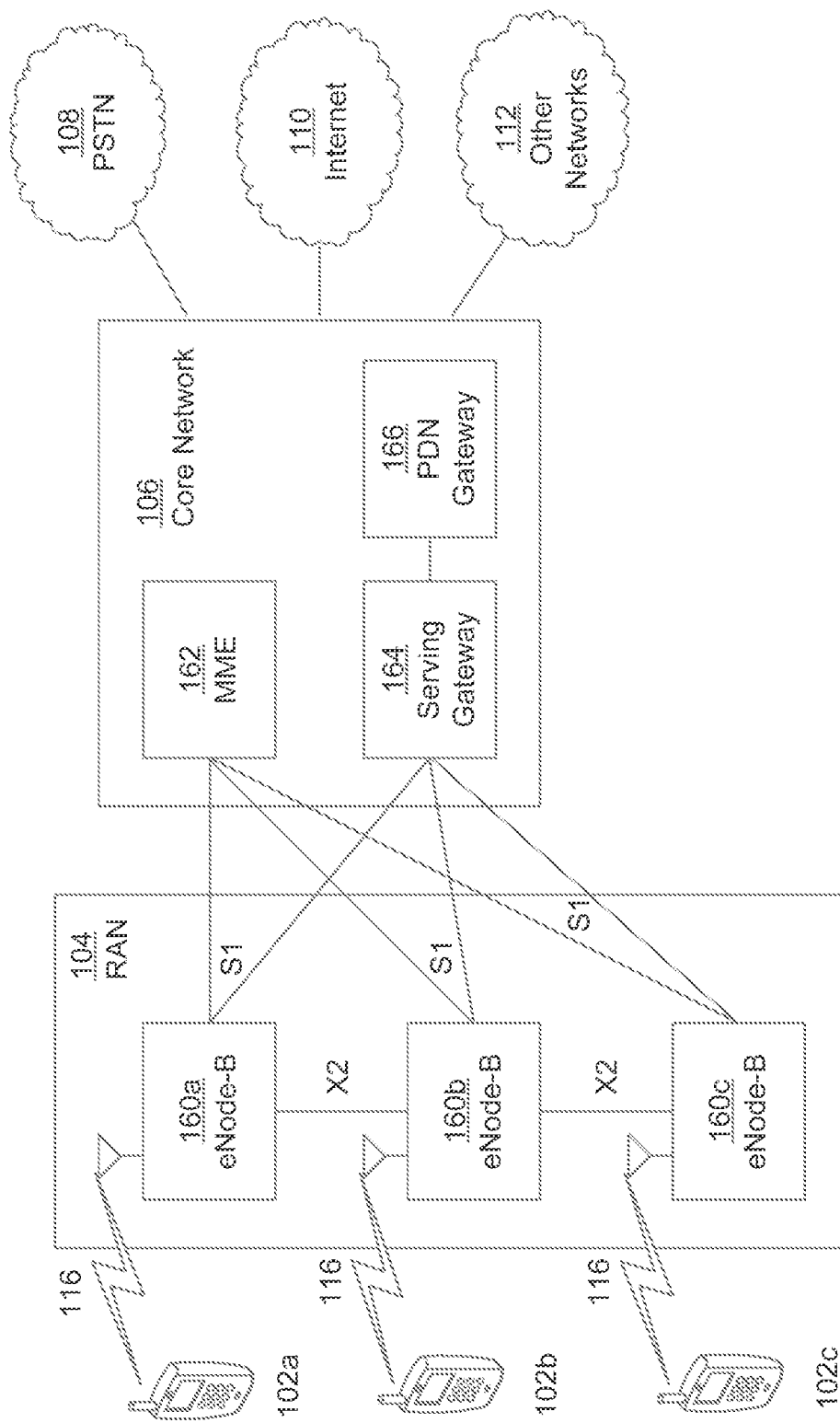
FIG. 22C is a system diagram of an example radio access network (RAN) and an example core network (CN) that may be used within the communications system illustrated in FIG. 22A.

FIG. 22C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 22C, the eNode-Bs 160a, 160b, 160c may communicate with one another over an X2 interface.

The CN 106 shown in FIG. 22C may include a mobility management entity (MME) 162, a serving gateway (SGW) 164, and a packet data network (PDN) gateway (or PGW) 166 While each of the foregoing elements are depicted as part of the CN 106, it will be appreciated that any of these elements may be owned and/or operated by an entity other titan the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 130b, 160c in the RAN 104 via tire S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access So the other networks 112, which may include other wired and/or wireless networks that are owned and/or operated by other service providers Although the WTRU is described in FIGS. 22A-22D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in infrastructure Basic Service Set (BSS) mode may have an Access Point (AP) for the BSS and one or mote stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within tire BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), inducting the AP, may sense the primary channel. If the primary channel is sensed/detected and/or determined to be busy by a particular STA, the particular STA may back off. One STA (e.g., only one station) may transmit at any given tints in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz. channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac, 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/of limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz The total bandwidth available for 802.11ah is 6 MHz to 26 MHz depending on the country code.

Figure 22D:
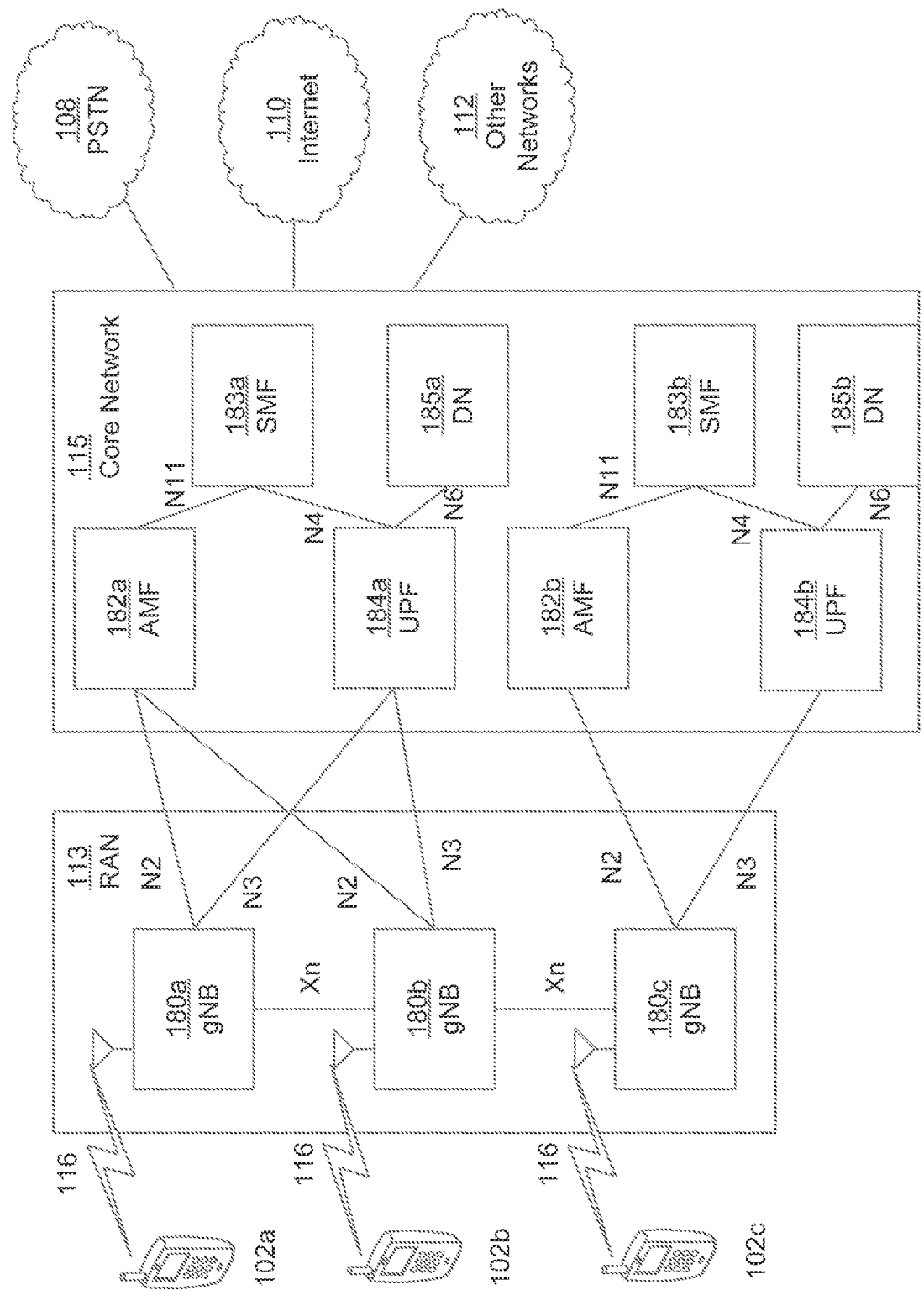
FIG. 22D is a system diagram of further example RAN and a further example CN that may he used within the communications system illustrated in FIG. 22A.

FIG. 22D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example. gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment the gNBs 180a, 180b, 180c may implement Coordinated Multi-Point (CoMP) technology. For example. WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration. WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c, may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 22D. the gNBs 180a, 180b, 180c may communicate with one another over an Xn Interface.

The CN 115 shown in FIG. 22D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than tire CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF: 184a, 184b in the CN 115 via an N4 interface. The SMF 183a, 183b may select and control the UPF 184a, 184b and configure the routing of traffic through the UPF 184a. 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a 184b and the DN 185a, 185b.

In view of FIG. 22A-22D, and the corresponding description of FIG. 22A-22D, one or more, or all, of the functions described herein with regard to one of more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The processes and techniques described herein may be implemented in a computer program, software, and/or firmware incorporated in a computer readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, Internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:

1. A device comprising:
a processor configured to:
obtain a plurality of pictures grouped into a plurality of random access segments (RASs), a picture comprising a plurality of faces, wherein a frame packing configuration corresponding to the plurality of pictures grouped into the plurality of RASs is updated periodically;
obtain a first frame packing configuration that indicates a face layout and a face rotation for a first RAS;
obtain, for a second RAS, a second frame packing configuration that is different than the first frame packing configuration for the first RAS; and
include a first indication of the first frame packing configuration for the first RAS and a second indication of the second frame packing configuration for the second RAS in a video bitstream.

2. The device of claim 1, wherein to obtain the first frame packing configuration for the first RAS, the processor is configured to:
determine a gradient for one or more faces comprised in a first picture of the first RAS;
determine potential costs associated with coding the first picture in a plurality of frame packing configurations based on the gradient for the one or more faces, wherein the plurality of frame packing configurations indicates a position and a rotation for the one or more faces comprised in the first picture; and
obtain a frame packing configuration having a lowest cost from the plurality of frame packing configurations.

3. The device of claim 2, wherein the first picture of the first RAS is an intra coded picture.

4. The device of claim 2, wherein the gradient for a face comprised in the first picture of the first RAS is a dominant gradient.

5. The device of claim 2, wherein the gradient for the face comprised in the first picture of the first RAS is computed on luma samples.

6. A method comprising:
obtaining a plurality of pictures grouped into a plurality of random access segments (RASs), a picture comprising a plurality of faces, wherein a frame packing configuration corresponding to the plurality of pictures grouped into the plurality of RASs is updated periodically;
obtaining a first frame packing configuration that indicates a face layout and a face rotation for a first RAS;
obtaining, for a second RAS, a second frame packing configuration that is different than the first frame packing configuration for the first RAS; and
including a first indication of the first frame packing configuration for the first RAS and a second indication of the second frame packing configuration for the second RAS in a video bitstream.

7. The method of claim 6, wherein obtaining the first frame packing configuration for the first RAS comprises:
determining a gradient for one or more faces comprised in a first picture of the first RAS;
determining potential costs associated with coding the first picture in a plurality of frame packing configurations based on the gradient for the one or more faces, wherein the plurality of frame packing configurations indicates a position and a rotation for the one or more faces comprised in the first picture; and
obtaining a frame packing configuration having a lowest cost from the plurality of frame packing configurations.

8. The method of claim 7, wherein the first picture of the first RAS is an intra coded picture.

9. The method of claim 7, wherein the gradient for a face comprised in the first picture of the first RAS is a dominant gradient.

10. The method of claim 7, wherein the gradient for a face comprised in the first picture of the first RAS is computed on luma samples.

11. A device comprising:
a processor configured to:
obtain a plurality of indications of a plurality of frame packing configurations corresponding to a plurality of pictures grouped into a plurality of random access segments (RAS), wherein a picture comprises a plurality of faces;
periodically change a frame packing configuration from the plurality of frame packing configurations corresponding to the plurality of pictures grouped into the plurality of RASs; and
obtain a location of face boundaries associated with the plurality of faces in the picture based on the periodically changed frame packing configuration.

12. The device of claim 11, wherein to periodically change the frame packing configuration from the plurality of frame packing configurations corresponding to the plurality of pictures grouped into the plurality of RASs, the processor is configured to cycle through the plurality of frame packing configurations.

13. The device of claim 11, wherein the plurality of frame packing configurations indicates a position and a rotation for a face associated with the corresponding plurality of RAS.

14. The device of claim 11, wherein the obtained location of face boundaries comprises locations of continuous and discontinuous face boundaries associated with the plurality of faces in the picture.

15. The device of claim 1, wherein the first indication indicates the first frame packing configuration associated with the first RAS, and wherein the second indication indicates the second frame packing configuration associated with the second RAS.

16. The device of claim 6, wherein the first indication indicates the first frame packing configuration associated with the first RAS, and wherein the second indication indicates the second frame packing configuration associated with the second RAS.

* * * * *